United States Patent
Watanabe et al.

(10) Patent No.: US 9,902,323 B2
(45) Date of Patent: Feb. 27, 2018

(54) PERIPHERY SURVEILLANCE APPARATUS AND PROGRAM

(71) Applicant: AISIN SEIKI KABUSHIKI KAISHA, Kariya-shi, Aichi-ken (JP)

(72) Inventors: Kazuya Watanabe, Anjo (JP); Tetsuya Maruoka, Okazaki (JP); Itsuko Ohashi, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 302 days.

(21) Appl. No.: 14/797,535

(22) Filed: Jul. 13, 2015

(65) Prior Publication Data

US 2016/0009225 A1  Jan. 14, 2016

(30) Foreign Application Priority Data

Jul. 14, 2014  (JP) .................................. 2014-144422

(51) Int. Cl.
*H04N 7/18* (2006.01)
*B60R 1/00* (2006.01)
(Continued)

(52) U.S. Cl.
CPC ................ *B60R 1/002* (2013.01); *B60R 1/00* (2013.01); *B60R 11/04* (2013.01);
(Continued)

(58) Field of Classification Search
CPC .................................... H04N 5/33; H04N 7/18
(Continued)

(56) References Cited

U.S. PATENT DOCUMENTS

| 7,930,078 B2 | 4/2011 | Sugiura et al. |
| 2010/0201818 A1 | 8/2010 | Imanishi et al. |

(Continued)

FOREIGN PATENT DOCUMENTS

| JP | 2006-327498 A | 12/2006 |
| JP | 4815993 B2 | 11/2011 |

(Continued)

OTHER PUBLICATIONS

Communication dated Oct. 23, 2015 from the European Patent Office in counterpart application No. 15176232.5.

*Primary Examiner* — Andy Rao
(74) *Attorney, Agent, or Firm* — Sughrue Mion, PLLC

(57) ABSTRACT

A periphery surveillance apparatus includes: a storage section storing captured image data from a capturing section capturing an image of a region including a road surface and a region upward therefrom, in a traveling direction of a vehicle; a display section selectively displaying at least one of past and present images, the past image based on captured image data corresponding to a current underfloor area among captured image data stored in the storage section, and the present image based on new captured image data captured and output by the capturing section; and a control section performing switching to the past image when a permission condition for permitting display of the past image is established during displaying the present image and performing switching to the present image when a recovery condition for performing recovery to the present image is established during displaying the past image.

12 Claims, 18 Drawing Sheets

(51) Int. Cl.
*G06K 9/00* (2006.01)
*B60R 11/04* (2006.01)

(52) U.S. Cl.
CPC ..... *G06K 9/00771* (2013.01); *G06K 9/00791* (2013.01); *H04N 7/181* (2013.01); *B60R 2300/105* (2013.01); *B60R 2300/304* (2013.01); *B60R 2300/806* (2013.01); *B60R 2300/8073* (2013.01)

(58) Field of Classification Search
USPC .......................................... 348/113–119, 148
See application file for complete search history.

(56) References Cited

U.S. PATENT DOCUMENTS

2013/0278771 A1* 10/2013 Magoun .................. H04N 5/33
348/148
2015/0254981 A1    9/2015 Tachibana et al.

FOREIGN PATENT DOCUMENTS

| JP | 5133340 B2 | 1/2013 |
| WO | 2008/143079 A1 | 11/2008 |
| WO | 2014/051125 A1 | 4/2014 |

* cited by examiner

PERIPHERY SURVEILLANCE APPARATUS AND PROGRAM

CROSS REFERENCE TO RELATED APPLICATIONS

This application is based on and claims priority under 35 U.S.C. § 119 to Japanese Patent Application 2014-144422, filed on Jul. 14, 2014, the entire contents of which are incorporated herein by reference.

TECHNICAL FIELD

Embodiments of this disclosure relate to a periphery surveillance apparatus and a program.

BACKGROUND DISCUSSION

As a technology for assisting parking of a vehicle, a technology for assisting driving of a driver in such a manner that surroundings of a vehicle are captured by using a camera which is installed in the vehicle, and captured image data which is a capturing result is displayed has been proposed.

Examples of the related art include Japanese Patent No. 4815993 and Japanese Patent No. 5133340.

When captured image data is obtained by performing capturing with a camera which is installed in a vehicle and the captured image data is displayed, as described in the related art, a displayed image may be appropriately switched. In such a situation, a display mode in which a display screen, on which the displayed image has been displayed, does not give an uncomfortable feeling to a user is desired.

SUMMARY

A periphery surveillance apparatus according to an aspect of this disclosure includes: a storage section that stores captured image data output from a capturing section for capturing an image of a region including a road surface and a region upward from the road surface, in a traveling direction of a vehicle; a display section that selectively displays at least one of a past image and a present image among pieces of captured image data which are stored in the storage section, the past image based on captured image data corresponding to a current underfloor area of the vehicle, and the present image based on new captured image data which is captured and output by the capturing section; and a control section that performs switching to the past image when a permission condition for permitting display of the past image is established during a time when the present image is displayed in the display section and performs switching to the present image when a recovery condition for performing recovery to the present image is established during a time of displaying the past image is displayed in the display section.

A periphery surveillance apparatus according to another aspect of this disclosure includes: a storage section that stores captured image data output from a capturing section for capturing an image of a region including a road surface and a region upward from the road surface, in a traveling direction of a vehicle; a display section that selectively displays at least one of a past image and a present image among pieces of captured image data which are stored in the storage section, the past image based on captured image data corresponding to a current underfloor area of the vehicle, and the present image based on new captured image data which is captured and output by the capturing section; and a control section that causes displaying to be performed in a first display mode when the present image is displayed, and causes an image having substantially the same viewpoint and field angle as the present image to be displayed in a second display mode different from the first display mode when the past image is displayed.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating an example of a state where a portion of the vehicle interior of a vehicle in which a periphery surveillance apparatus according to an embodiment is mounted is shown through;

DETAILED DESCRIPTION

In an embodiment which will be described later, a vehicle 1 may be, for example, an automobile (internal combustion engine automobile) which uses an internal combustion engine (engine, not illustrated) as a driving source or an automobile (electric automobile, fuel cell automobile, and the like) which uses an electromotor (motor, not illustrated) as the driving source. In addition, the vehicle 1 may be an automobile (hybrid automobile) which uses both of the internal combustion engine and the electromotor as the driving source. In the vehicle 1, various transmission apparatuses may be mounted and various apparatuses (systems, components, and the like) necessary for driving the internal combustion engine or the electromotor may be mounted. In the vehicle 1, types, the number, a layout and the like of apparatuses relating to driving of a wheel 3 may be variously set.

Figure 1:
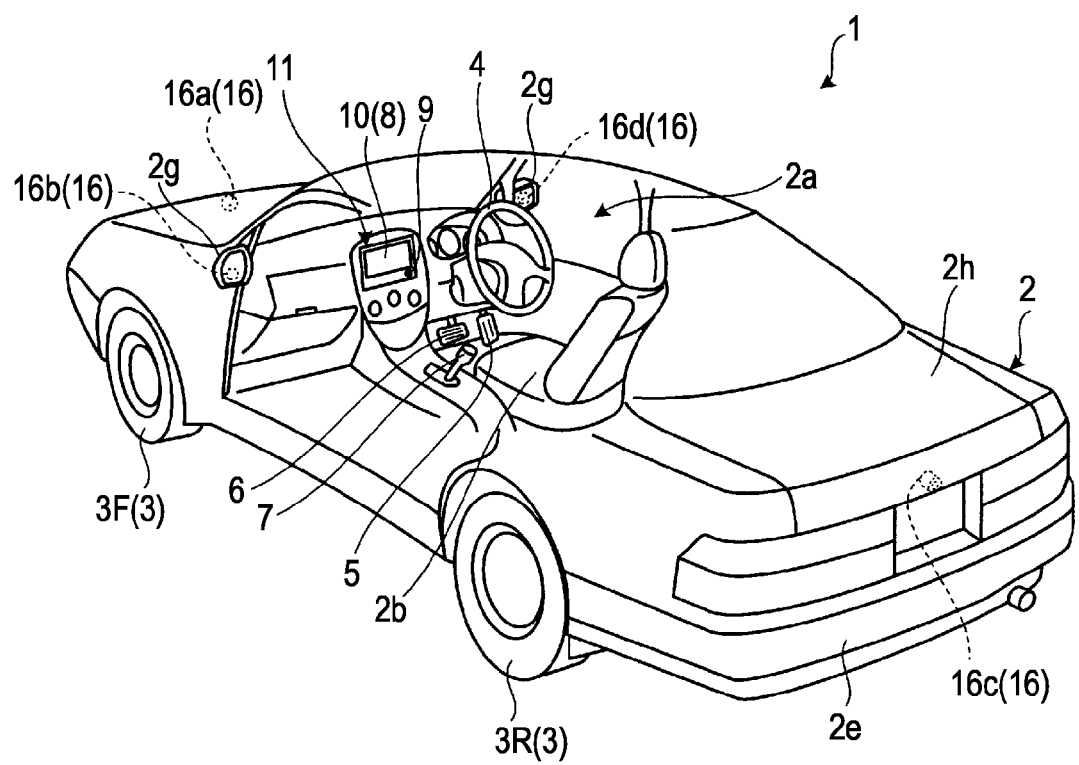

As illustrated in FIG. 1, a vehicle body 2 according to the embodiment includes a vehicle interior 2a for an occupant (not illustrated) riding in the vehicle. In the vehicle interior 2a, a steering section 4, an acceleration operation section 5, a brake operation section 6, a gear shift operation section 7, and the like are provided so as to face a seat 2b of a driver as the occupant. In this embodiment, for example, the steering section 4 may be a steering wheel which protrudes from a dashboard (instrument panel). The acceleration operation section 5 may be an accelerator pedal which is positioned under the feet of the driver. The brake operation section 6 may be a brake pedal which is positioned under the feet of the driver. The gear shift operation section 7 may be a shift lever which protrudes from a center console. These components are not limited to these examples.

In the vehicle interior 2a, a display apparatus 8 (display output section) and a sound output apparatus 9 (sound output section) are provided. The display apparatus 8 may be a liquid crystal display (LCD), an organic electroluminescent display (OELD), or the like, for example. The sound output apparatus 9 may be a speaker, for example. In this embodiment, for example, the display apparatus 8 is covered with a transparent operation input section 10 (for example, touch panel and the like). The occupant or the like can visually recognize a picture (image) which is displayed on a display screen of the display apparatus 8, through the operation input section 10. The occupant or the like can input an operation (input an instruction) by performing an operation of touching or pressing the operation input section 10 with the finger or the like at a position corresponding to a picture (image) which is displayed on the display screen of the display apparatus 8. In this embodiment, for example, the display apparatus 8, the sound output apparatus 9, the operation input section 10, and the like are provided in a monitor device 11 which is positioned at the center portion of the dashboard in a vehicle width direction (crosswise direction). The monitor device 11 may have an operation input section (not illustrated) such as a switch, a dial, a joystick, and a push button. A sound output apparatus (not illustrated) may be provided at a position different from the monitor device 11 in the vehicle interior 2a, and sound may be output from the sound output apparatus 9 of the monitor device 11 and the other sound output apparatus. In this embodiment, for example, the monitor device 11 is also used as a component of a navigation system or an audio system. However, the monitor device for a periphery surveillance apparatus may be provided separately from these systems.

Figure 2:
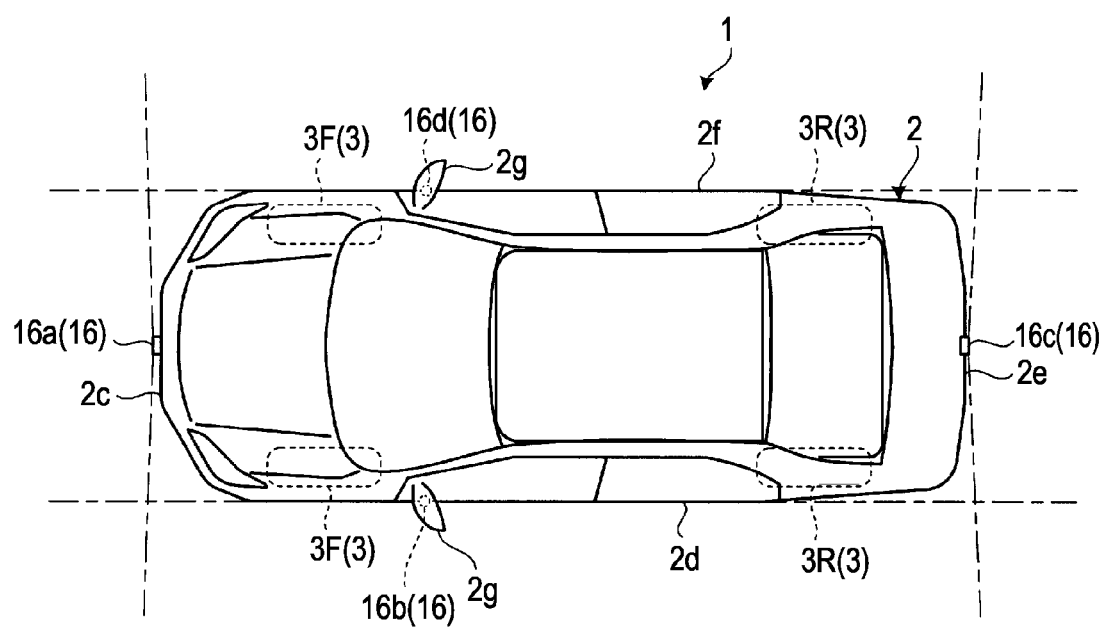
FIG. 2 is a plan view (overhead view) illustrating an example of the vehicle in which the periphery surveillance apparatus according to the embodiment is mounted.
Figure 3:
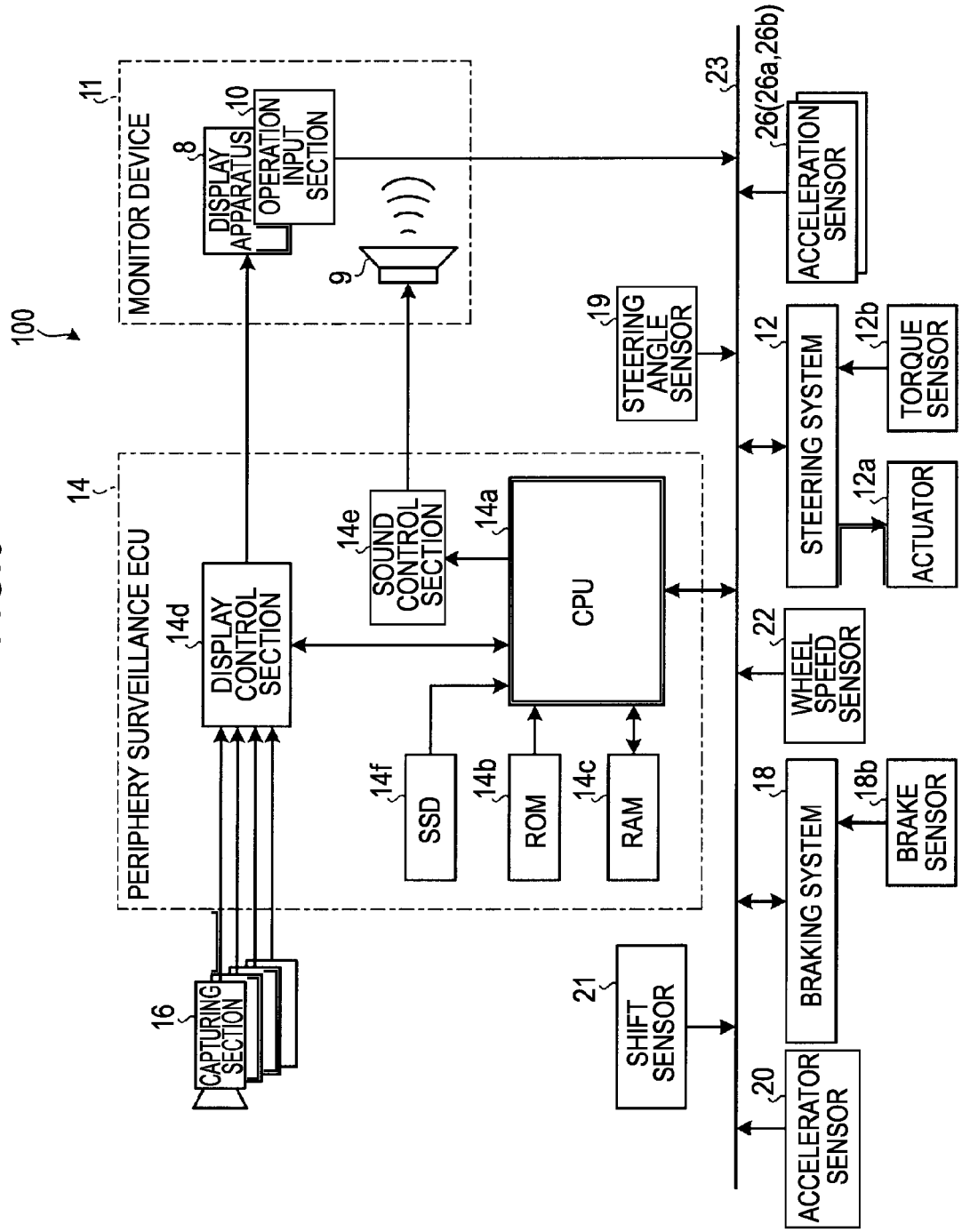
FIG. 3 is a block diagram illustrating an example of a periphery surveillance system including the periphery surveillance apparatus according to the embodiment.

As illustrated in FIGS. 1 and 2, in the embodiment, for example, the vehicle 1 may be a four-wheeled vehicle (four-wheeled automobile) and the vehicle 1 has two right and left front wheels 3F and two right and left rear wheels 3R. Thus, a tire angle of, for example, the front wheel 3F changes (steers) in accordance with an operation of the steering section 4 (steering wheel). A steering system 12 (see FIG. 3) may be an electric power steering system, a steer by wire (SBW) system, or the like. In the steering system 12, torque (assist torque) is added to the steering section 4 by an actuator 12a so as to supplement a steering effort and thus the front wheels 3F are steered, as illustrated in FIG. 3.

In this embodiment, for example, as illustrated in FIG. 2, a plurality of capturing sections 16 (16a to 16d) (four in this embodiment) is provided in the vehicle 1 (vehicle body 2). Each of the capturing sections 16 may be a digital camera including an imaging element such as a charge coupled device (CCD) and a CMOS image sensor (CIS), for example. The capturing section 16 may output captured image data (video data or frame data) at a predetermined frame rate. The capturing section 16 may have a wide-angle lens and thus shoot (capture) a region in a range (angle of field) of, for example, 140° to 220° in a horizontal direction. The capturing section 16 has an optical axis which is set to be directed downwardly (for example, downward of a vertical direction or a slant). Thus, the capturing section 16 may capture an image of an external environment around the vehicle body 2, which includes a road surface on which the vehicle 1 can move, and a region upward from the road surface.

In this embodiment, the capturing section 16a which functions as, for example, a first capturing section is disposed at an end portion 2c (end portion in a plan view) of the vehicle body 2 on the anterior side (front side in a vehicle longitudinal direction) thereof and is provided at the front grille or the like. The capturing section 16b which functions as a second capturing section is disposed at an end portion 2d of the vehicle body 2 on the left side thereof (on the left side in the vehicle width direction) and is provided at a side mirror 2g (protrusion) on the left side. The capturing section 16c which functions as the first capturing section is disposed at an end portion 2e of the vehicle body 2 on the posterior side thereof (rear side in the vehicle longitudinal direction) and is provided at a downward wall portion of a door 2h of a rear trunk. The capturing section 16d which functions as the second capturing section is disposed at an end portion 2f of the vehicle body 2 on the right side thereof (right side in the vehicle width direction) and is provided at a side mirror 2g (protrusion) on the right side. In this embodiment, a vehicle mounting method of the camera is not limited and may be installed such that captured image data in a frontward direction of the vehicle, captured image data in right and left side directions of the vehicle, and captured image data in a rearward direction of the vehicle can be obtained.

A periphery surveillance ECU 14 (see FIG. 3) may perform computation processing or image processing based on pieces of captured image data which are obtained by the plurality of capturing sections 16 and cause the captured image data subjected to the image processing to be displayed in the display apparatus 8. The captured image data will be described later, but, for example, captured image data which is obtained through capturing of the capturing section 16a for shooting (capturing) the front of the vehicle is used as a present image depicting the current circumstances of the vehicle, as it is. Thus, storing of the captured image data causes the captured image data which has been used as the present image to be used as captured image data depicting the foretime circumstances of the vehicle, as it is, and thus to be displayed as a past image. The past image will be described later, but, for example, may be an image depicting an underfloor region at the current position of the vehicle.

In this embodiment, for example, as illustrated in FIG. 3, a braking system 18, a steering angle sensor 19 (angle sensor), an accelerator sensor 20, a shift sensor 21, a wheel speed sensor 22, and an acceleration sensor 26 in addition to the periphery surveillance ECU (electronic control unit) 14, the monitor device 11, and the like are electrically connected to each other through an in-vehicle network 23 (electric communication line) in a periphery surveillance system (periphery surveillance apparatus) 100. The in-vehicle network 23 is configured as a controller area network (CAN), for example. The periphery surveillance ECU 14 may transmit a control signal through the in-vehicle network 23 so as to control the braking system 18 and the like. The periphery surveillance ECU 14 may receive a detection result of a torque sensor 12b, a brake sensor 18b, the steering angle sensor 19, the accelerator sensor 20, the shift sensor 21, the wheel speed sensor 22, the acceleration sensor 26, or the like, through the in-vehicle network 23. The periphery surveillance ECU 14 may receive an instruction signal (control signal, operation signal, input signal, and data) of the operation input section 10 and the like.

In this embodiment, two acceleration sensors 26 (26a and 26b) are provided in the vehicle 1. In this embodiment, the vehicle 1 is a vehicle having electronic stability control (ESC). The acceleration sensors 26 (26a and 26b) which have been conventionally mounted in a vehicle are used in the vehicle having the ESC. In this embodiment, types of the acceleration sensor are not limited, and a sensor which enables acceleration of the vehicle 1 in the crosswise direction to be detected may be provided. In this embodiment, acceleration in the front-back direction and acceleration in the crosswise direction are obtained.

The periphery surveillance ECU 14 includes, for example, a central processing unit (CPU) 14a, a read only memory (ROM) 14b, a random access memory (RAM) 14c, a display control section 14d, a sound control section 14e, a solid state drive (SSD, flash memory) 14f, and the like. The CPU 14a performs, for example, image processing associated with an image which is displayed in the display apparatus 8, various types of computation processing such as computation of a movement path of the vehicle 1 and determination of whether there is interference with an object. The CPU 14a reads a program which is stored (installed) in a non-volatile storage device such as the ROM 14b, and performs the computation processing in accordance with the read program.

The RAM 14c temporarily stores various items of data which are used in computation of the CPU 14a. The display control section 14d mainly performs image processing which uses captured image data obtained by the capturing section 16 or image processing (for example, composition and the like) of captured image data which is displayed in the display apparatus 8, among the various types of the computation processing in the periphery surveillance ECU 14. The sound control section 14e mainly performs processing of sound data which is output from the sound output apparatus 9, among the various types of the computation processing in the periphery surveillance ECU 14. The SSD 14f is a storage section which is rewritable and non-volatile. The SSD 14f enables storing of data even though a power source of the periphery surveillance ECU 14 turns off. The CPU 14a, the ROM 14b, the RAM 14c, and the like may be integrated in the same package. The periphery surveillance ECU 14 may be configured by using other arithmetic logic processors or other arithmetic logic circuits such as a digital signal processor (DSP), instead of the CPU 14a. A hard disk drive (HDD) may be provided instead of the SSD 14f. The SSD 14f or the HDD may be provided separately from the periphery surveillance ECU 14.

Figure 4:
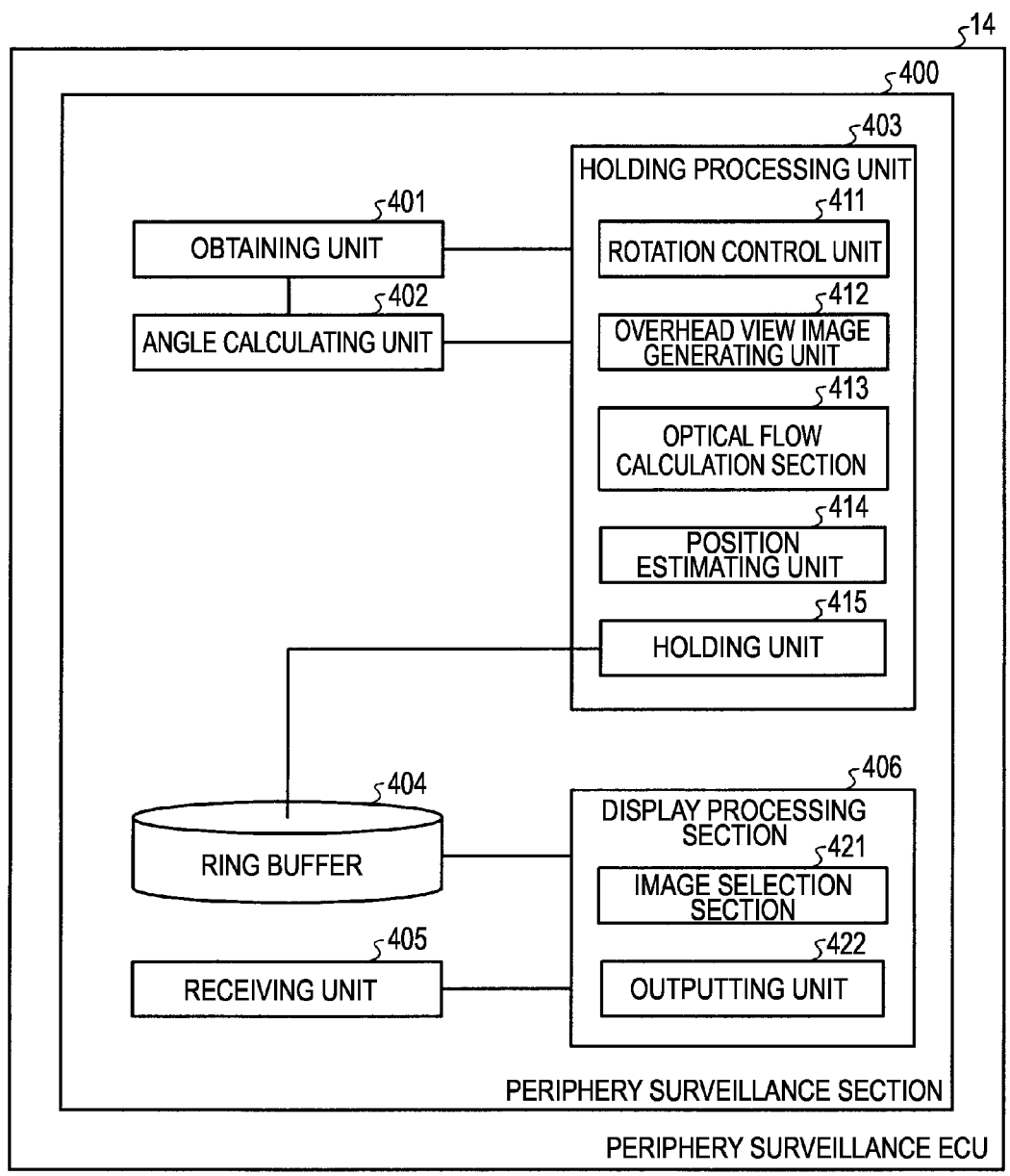
FIG. 4 is a block diagram illustrating a configuration of a periphery surveillance section which is implemented in a periphery surveillance ECU of the periphery surveillance apparatus according to the embodiment.

FIG. 4 is a block diagram illustrating a configuration of a periphery surveillance section 400 implemented in the periphery surveillance ECU 14 according to this embodiment. The CPU 14a which is configured as the periphery surveillance ECU 14 in FIG. 3 is realized as an obtaining unit 401, an angle calculating unit 402, a holding processing unit 403, a receiving unit 405, and a display processing section 406 which are illustrated in FIG. 4, by executing software which is stored in the ROM 14b (computer readable recording medium). The software (program) may be provided through other computer readable recording media. The periphery surveillance section 400 realizes a ring buffer 404 on the RAM 14c.

Figure 5:
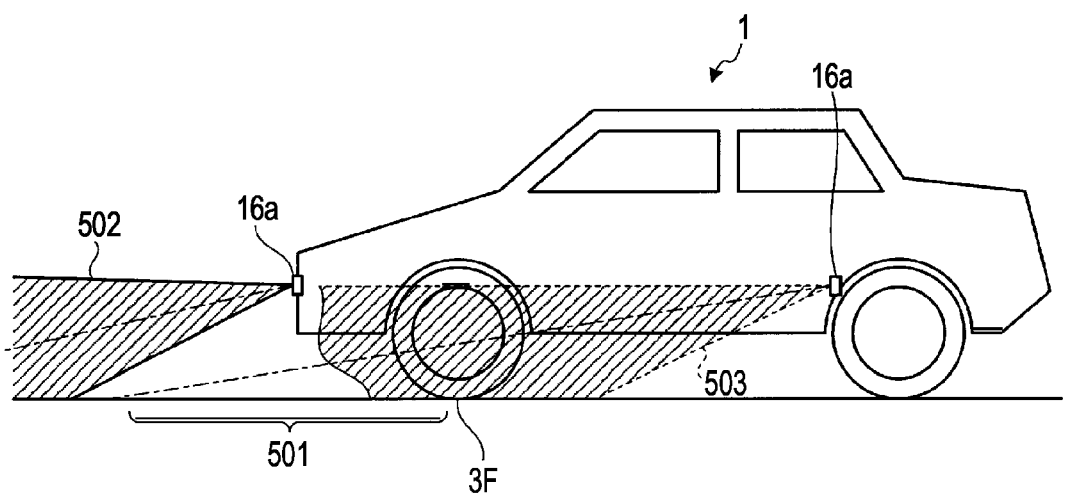
FIG. 5 is a diagram illustrating a capturing region of a capturing section of the vehicle in which the periphery surveillance apparatus according to the embodiment is mounted.

FIG. 5 is a diagram illustrating a capturing region by the capturing section 16a of the vehicle 1 according to the embodiment. As illustrated in FIG. 5, the capturing section 16a captures a region which includes a road surface in a traveling direction of the vehicle 1 and an upward region from the road surface (opposite direction of the gravity direction) and includes at least the horizon. However, a road surface 501 in the vicinity of the front wheels 3F of the vehicle 1 is not included in a capturing region 502 which is being captured by the capturing section 16a. In addition, it is difficult to include a region to the underfloor in the vicinity of the front wheels 3F as the capturing region, due to an influence of the disposition of a bumper and the like of the vehicle 1 (structural influence of the vehicle 1).

For this reason, it is difficult for a driver (user) to check whether or not there is an obstacle or the like in the vicinity of the front wheels 3F of the vehicle 1 even though captured image data which is currently being captured is visually recognized. Thus, in this embodiment, the periphery surveillance section 400 which functions as a control section enables displaying of captured image data which has been captured previously by the capturing section 16a, in accordance with a demand of the driver. In other words, the captured image data which has been captured previously means captured image data which has been captured at a rearward position of the current position of the vehicle 1, and may be captured image data corresponding to the underfloor area at the current position of the vehicle 1 in the example of FIG. 5.

For example, it is considered that the periphery surveillance section 400 provides the driver with captured image data obtained by capturing a capturing region 503, as captured image data which has been captured at the rearward position of the vehicle 1 (position before the vehicle reaches the current position of the vehicle 1) by the capturing section 16a. Since the road surface 501 is included in the capturing region 503, the driver can confirm the road surface 501 in the vicinity of the front wheels 3F. Thus, since the driver can drive in a state where circumstances of the road surface 501 are confirmed, it is possible to reduce burden of the driving. Next, returning to FIG. 4, a configuration of the periphery surveillance section 400 will be described.

The obtaining unit 401 obtains various pieces of information from various sensors and the like which are included in the vehicle 1. The obtaining unit 401 according to this embodiment obtains captured image data output from the capturing sections 16a to 16d which are provided in the vehicle 1 and capture the surroundings of the vehicle 1, and acceleration data output from the acceleration sensors 26a and 26b which are provided in the vehicle 1. The obtaining unit 401 outputs the obtained information to the angle calculating unit 402 and the holding processing unit 403.

The obtaining unit 401 correlates captured image data at a time which is substantially the same time as a time at which the acceleration is detected, with acceleration data.

The angle calculating unit 402 calculates an inclination angle (pitch angle and roll angle) of the vehicle 1 based on the acceleration data obtained by the acceleration sensors 26a and 26b. The pitch angle refers to an angle indicating inclination from right and left axes of the vehicle 1, and the roll angle refers to an angle indicating inclination from front and rear axes of the vehicle 1.

The angle calculating unit 402 correlates the roll angle and the pitch angle which are calculated based on the acceleration data, with the captured image data which has been correlated with the acceleration data. Thus, it is possible to confirm the roll angle and the pitch angle of the vehicle 1 when the captured image data is captured.

The holding processing unit 403 includes a rotation control unit 411, an overhead view image generating unit 412, an optical flow calculation section 413, a position estimating unit 414, and a holding unit 415. The holding processing unit 403 generates supplementary image data for performing displaying in the display apparatus 8 and holds the generated image data along with the captured image data shot (captured) by the capturing section 16.

The rotation control unit 411 performs rotation correction on captured image data which is captured by the capturing section 16a and is obtained by replicating the front surroundings (in the traveling direction) of the vehicle 1.

The rotation control unit 411 according to this embodiment sets position coordinates of the captured image data in a display area, which corresponds to the center of a lens used in capturing of the capturing section 16a, as an origin and performs the rotation correction in accordance with the roll angle which is correlated with the captured image data. A target of the rotation correction is not limited to the captured image data which is captured by the capturing section 16a, and may be, for example, captured image data which is captured by the capturing section 16c, and is obtained by replicating the rear surroundings of the vehicle 1.

The overhead view image generating unit 412 generates overhead view image data based on captured image data which is subjected to rotation control, and the overhead view image data is obtained by overlooking the ground around the vehicle 1 which is the ground in the traveling direction of the vehicle 1, from an upper part. As a method of generating the overhead view image data based on the captured image data, any method may be used. For example, conversion may be performed by using a mapping table.

The overhead view image data is generated every time the captured image data is obtained. In other words, the overhead view image generating unit 412 generates first overhead view image data based on first captured image data which is subjected to rotation control by the rotation control unit 411. Then, the overhead view image generating unit 412 generates second overhead view image data based on second captured image data which is captured by the capturing section 16 and is subjected to the rotation control by the rotation control unit 411 after the first captured image data is shot (captured) and then the vehicle 1 moves.

The optical flow calculation section 413 calculates an optical flow based on overhead view image data which is calculated by the overhead view image generating unit 412. The optical flow refers to information obtained by indicating the motion of an object which is reflected in the overhead view image data, using a vector. It is possible to estimate a movement amount of the vehicle 1 by calculating the optical flow.

The optical flow calculation section 413 according to this embodiment compares overhead view image data which is generated by the overhead view image generating unit 412, to overhead view image data which was used when previous updating was performed, and thus calculates the optical flow.

However, if comparison is performed on all pieces of the overhead view image data, a processing burden becomes larger. Thus, the optical flow calculation section 413 according to this embodiment performs comparison of a predefined area in the overhead view image data which is generated by the overhead view image generating unit 412.

Specifically, the optical flow calculation section 413 according to this embodiment cuts the predefined areas from the first overhead view image data used when previous updating was performed, and the second overhead view image data generated after the first overhead view image data, and thus calculates the optical flow. An overhead view may be created by using only the predefined areas.

Figure 6A:
FIGS. 6A-6C are diagrams illustrating a concept of an optical flow which is calculated by an optical flow calculation section of the periphery surveillance apparatus according to the embodiment.
Figure 6C:
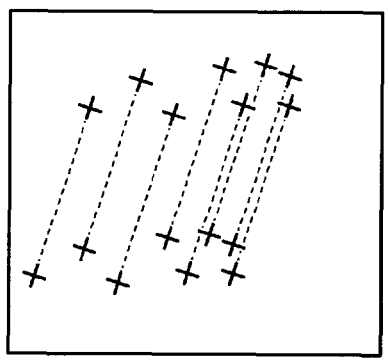
Figure 6B:

FIGS. 6A-6C are diagrams a diagram illustrating a concept of the optical flow calculated by the optical flow calculation section 413. FIG. 6A illustrates image data obtained by cutting off the first overhead view image data used when previous updating was performed, in a predefined range. FIG. 6B illustrates image data obtained by cutting off the second overhead view image data which is generated at this time by the overhead view image generating unit 412, in a predefined range.

The optical flow calculation section 413 calculates optical flows which indicate transitioning of (feature points of) a displayed object between the image data illustrated in (FIG. 6A, and the image data illustrated in FIG. 6A, by using a vector. FIG. 6C illustrates an example of the calculated optical flows. Lengths of vectors are obtained by feature points (indicated by "x") illustrated in FIG. 6A moving up to feature point (indicated by "x") illustrated in FIG. 6B, and the lengths are illustrated in the example illustrated in FIG. 6C.

The position estimating unit 414 calculates a movement amount of the vehicle 1 based on an average value of the optical flows calculated by the optical flow calculation section 413, and thus estimates the current position of the vehicle 1. The movement amount may be directly calculated based on each of the detected optical flows.

In this embodiment, the current position of the vehicle 1 is estimated by using the optical flow. Regarding this, when the vehicle 1 travels off-road, the occupant (driver) wishes to figure out the circumstances of the underfloor of the vehicle 1, for example, the vicinity of the front wheels 3F of the vehicle 1, in many cases. Regarding traveling off-road, it is considered that wheel slip or the like of the wheel 3 occurs due to an influence of the rough road surface and the like. In this case, if the movement amount of the vehicle 1 is estimated based on the number of revolutions of the wheel 3, there is a large probability of generating an error. Thus, in this embodiment, the movement amount and the position of the vehicle 1 are estimated based on the optical flow. When the wheel 3 does not slip on the road, the movement amount and a movement direction may be calculated based on rotation of the wheel 3 and a steering angle, and thus the current position may be estimated.

The holding unit 415 holds captured image data subjected to the rotation control by the rotation control unit 411 along with position information of the vehicle 1 in the ring buffer 404 when at least one of conditions is satisfied. The conditions include a condition that the movement amount of the vehicle 1 which has been held the previous time is equal to or greater than a predetermined distance, and a condition that a movement angle of the vehicle 1 is equal to or greater than a predetermined angle. In this embodiment, the predetermined distance is not limited, but, for example, 0.3 m, 0.5 m, and the like are considered as the predetermined distance. As the predetermined angle, for example, 2 deg and the like are considered.

Figure 7:
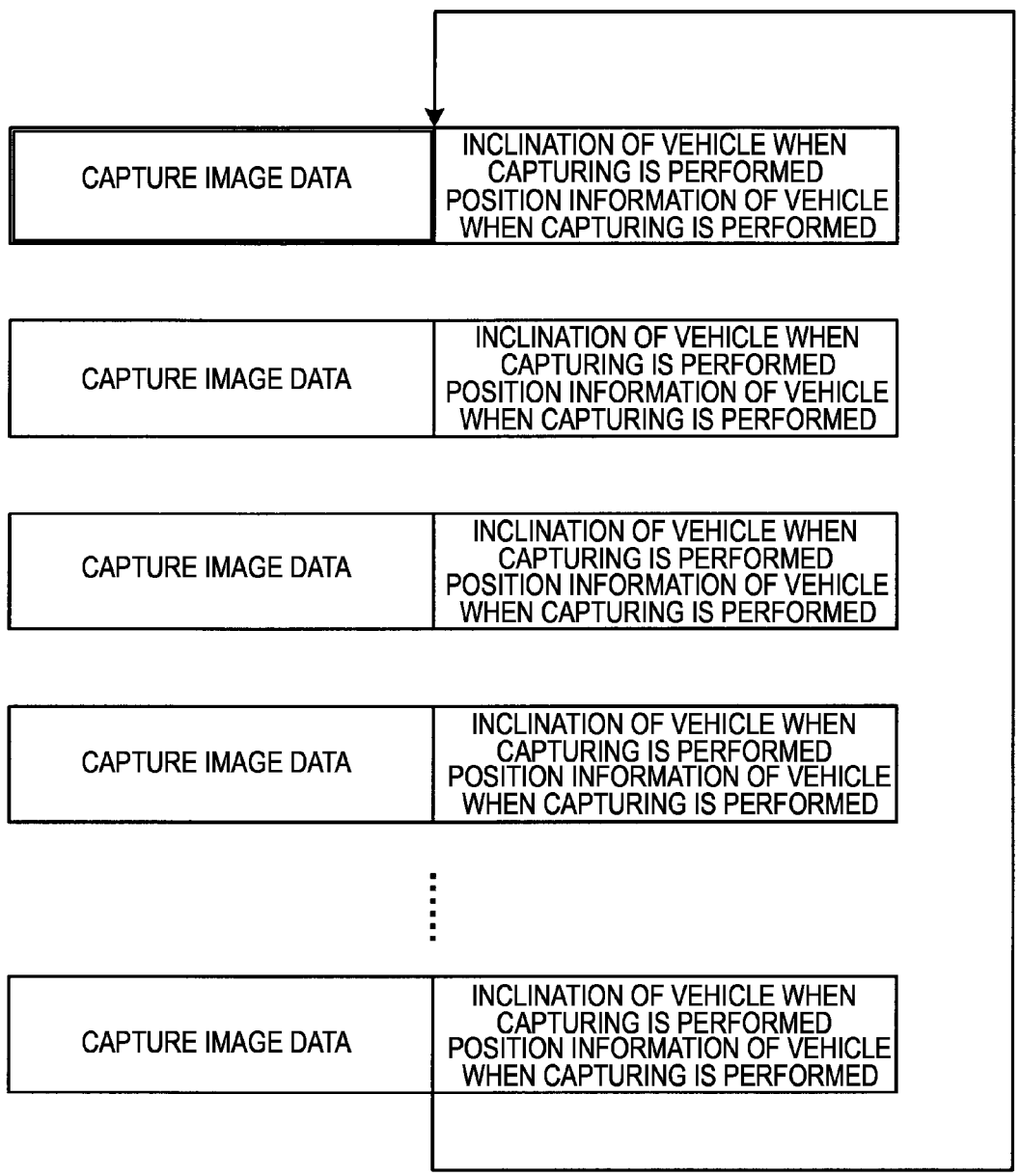
FIG. 7 is a diagram illustrating a structure of a ring buffer of the periphery surveillance apparatus according to the embodiment.

The ring buffer 404 holds the current captured image data output from the capturing section 16a in correlation with information at a time of capturing. FIG. 7 is a diagram illustrating a structure of the ring buffer 404. As illustrated in FIG. 7, the ring buffer 404 stores captured image data in correlation with inclination of the vehicle 1 (in the traveling direction), and the position information of the vehicle 1 when the corresponding captured image data is obtained by performing capturing.

As illustrated in FIG. 7, the ring buffer 404 is a buffer which is disposed so as to logically have a ring shape. In the ring buffer 404, captured image data and the like of a holding request of the holding unit 415 is overwritten and held in a region in which the oldest updating was performed, in accordance with the holding request.

The receiving unit 405 receives an instruction signal (control signal) from the operation input section 10. The receiving unit 405 according to this embodiment receives a switching operation from the instruction signal. The switching operation indicates which image data is displayed in the display apparatus 8 among captured image data (present image) which is obtained currently by the capturing section 16a, and the previous captured image data (in other words, underfloor depiction of the vehicle 1; past image) which has been stored in the ring buffer 404. When it is determined that a permission condition for permitting switching from the present image to the past image is not established, the periphery surveillance ECU 14 (which will be described later) does not perform switching from the present image to the past image, for example, even though an operation of the operation input section 10 and the like is performed and a display request for the past image is received. When a recovery condition for performing recovery from the past image to the present image is established, the periphery surveillance ECU 14 performs switching from the past image to the present image, for example, even though an operation of the operation input section 10 and the like is performed and the display request for the past image continues. That is, when the recovery condition is established, the periphery surveillance ECU 14 causes the present image to be forcibly displayed (forcibly recovered to the present image) regardless of whether or not a display requiring operation for the past image is performed by a user.

The display processing section 406 includes an image selection section 421 and an outputting unit 422. The display processing section 406 performs display processing on the display apparatus 8 in accordance with an operation received by the receiving unit 405.

Figure 8:
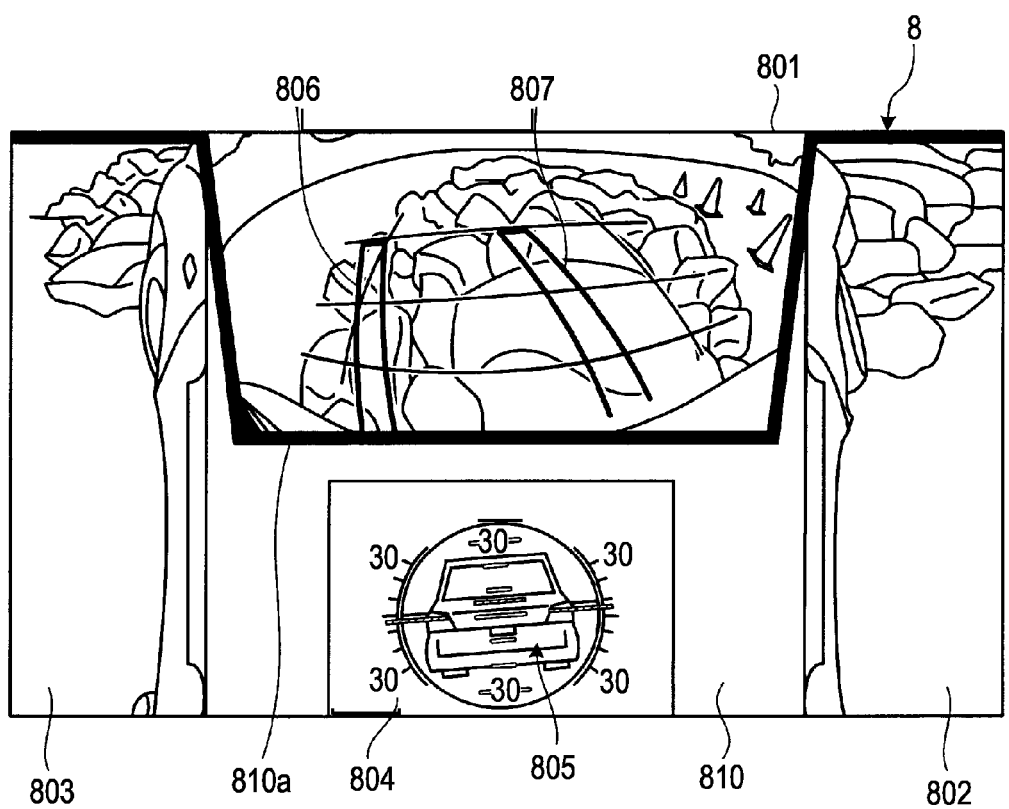
FIG. 8 is a diagram illustrating a screen example including the present image which is subjected to display processing by a display processing section of the periphery surveillance apparatus according to the embodiment.

FIG. 8 is a diagram illustrating a screen example for a display of the present image (present image mode) which is subjected to the display processing by the display processing section 406. As illustrated in FIG. 8, in the screen example of the present image mode, images depicting the current state on sides of the vehicle 1 are displayed along with the present image 801, based on captured image data which is currently being captured by the capturing section 16a. The images on the sides of the vehicle 1 include a present side image 802 and a present side image 803. The present side image 802 is obtained based on side captured image data which is currently captured by the capturing section 16d and in which surroundings of the front wheel 3F on the right side of the vehicle 1 are included. The present side image 803 is obtained based on side captured image data which is currently captured by the capturing section 16b and in which surroundings of the front wheel 3F on the left side of the vehicle 1 are included. The pitch angle and the roll angle of the vehicle 1 are displayed as recognizable information, on the display area 804. That is, the roll angle is indicated by inclination of an icon 805 indicating the vehicle 1, and the pitch angle is indicated by a distance between the center line through which the icon 805 passes and a horizontal line. In this embodiment, the roll angle and the pitch angle are indicated so as to be recognizable, in such a display mode. However, it is not limited to such a display mode and other display modes may be applied. For example, the display area 804 may be displayed in other display apparatuses except for the display apparatus 8. In this case, since a display area usable in the display apparatus 8 becomes larger, it is possible to increase a display area for the present image 801 (past image 808 which will be described later), for example. In this case, it is possible to provide the user (driver) with much more vehicle surrounding information. A display mode for displaying such a display area 804 and a non-display mode may be selected by a selecting operation of the user (driver).

Wheel traces 806 and 807 (predicted travel trace) are displayed on the present image 801. The wheel traces 806 and 807 indicate a traveling direction of the front wheels 3F in accordance with the steering angle obtained from the steering angle sensor 19. Thus, the driver can drive in a state of confirming the traveling direction of the vehicle 1.

Figure 9:
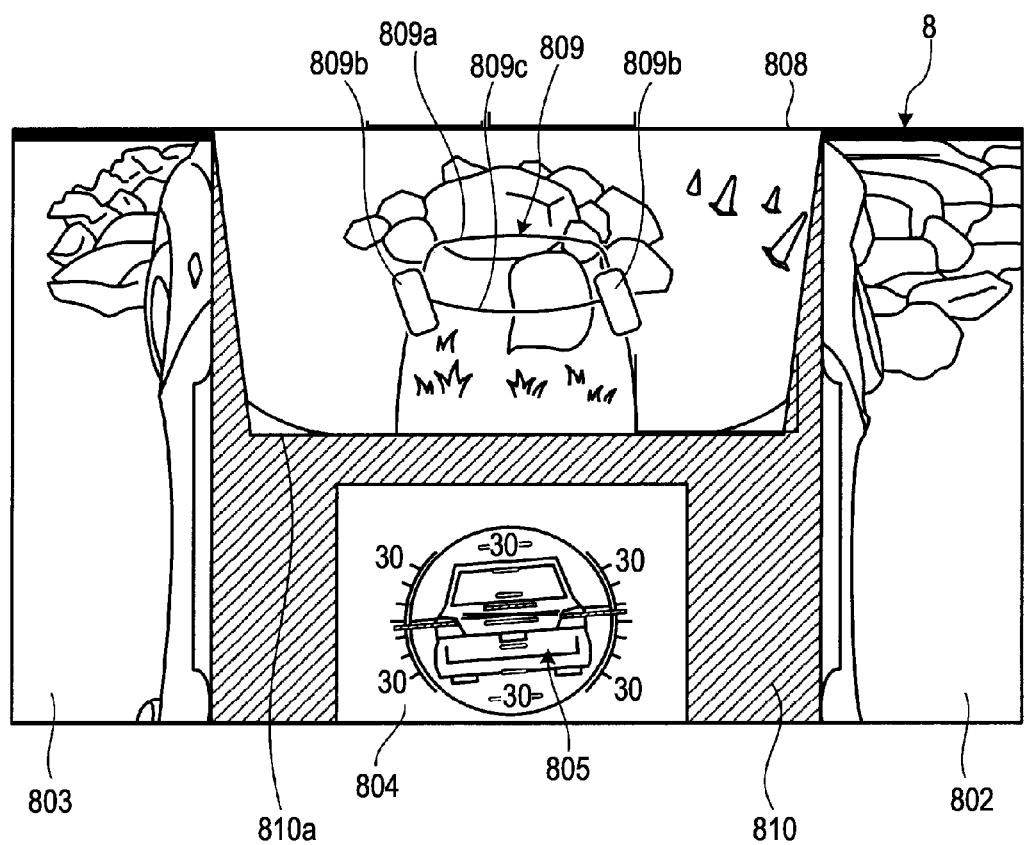
FIG. 9 is a diagram illustrating a screen example including the past image (underfloor image) which is subjected to the display processing by the display processing section of the periphery surveillance apparatus according to the embodiment.

However, it is difficult to check the circumstances in the vicinity of the underfloor of the vehicle 1 in the screen example illustrated in FIG. 8. Thus, in the display processing section 406 of the periphery surveillance section 400 according to this embodiment, the display image in the display apparatus 8 can be switched to an image for displaying the vicinity of the underfloor of the vehicle 1. Specifically, as illustrated in FIG. 9, the past image 808 is displayed instead of the present image 801 (past image mode). The past image 808 is for displaying captured image data which was shot (captured) previously by the capturing section 16a. Thus, in a case of this embodiment, the past image 808 is used as an image indicating an underfloor position of the vehicle 1 at the current position of the vehicle 1. That is, the past image 808 is an image for an underfloor area which is in a blind spot of the user (driver) due to moving (traveling) of the vehicle 1. The display processing section 406 displays captured image data of the present image 801 which was shot (captured) previously and is not processed (composition of a region, rotation and reduction of the region, and the like), as the past image 808. That is, the present image 801 and the past image 808 are displayed as images having substantially the same viewpoint and field angle. In this manner, captured image data itself which was shot (captured) as the present image 801 is used as the past image 808 and thus it is possible to simplify image display processing. Contents of the present image 801 and contents of the past image 808 are easily correlated with each other, and thus it is possible to contribute to improvement of distinction of the user between the present image 801 and the past image 808.

Returning to FIG. 4, a configuration of the display processing section 406 will be described. The image selection section 421 selects captured image data which will be displayed, from pieces of captured image data which are stored in the ring buffer 404, when an instruction for performing switching to an underfloor display which corresponds to the past image 808 is received by the receiving unit 405.

The image selection section 421 according to this embodiment selects captured image data from the ring buffer 404 in order to display the past image 808. The selected captured image data is captured image data which was captured previously by the capturing section 16a and includes the current road surface corresponding to the vehicle 1. That is, if the captured image data in which a road surface considered as (corresponding to) the current position of the vehicle is included is displayed on the captured road surface, underfloor display (display of the past image 808) of the vehicle 1 can be realized.

Figure 10:
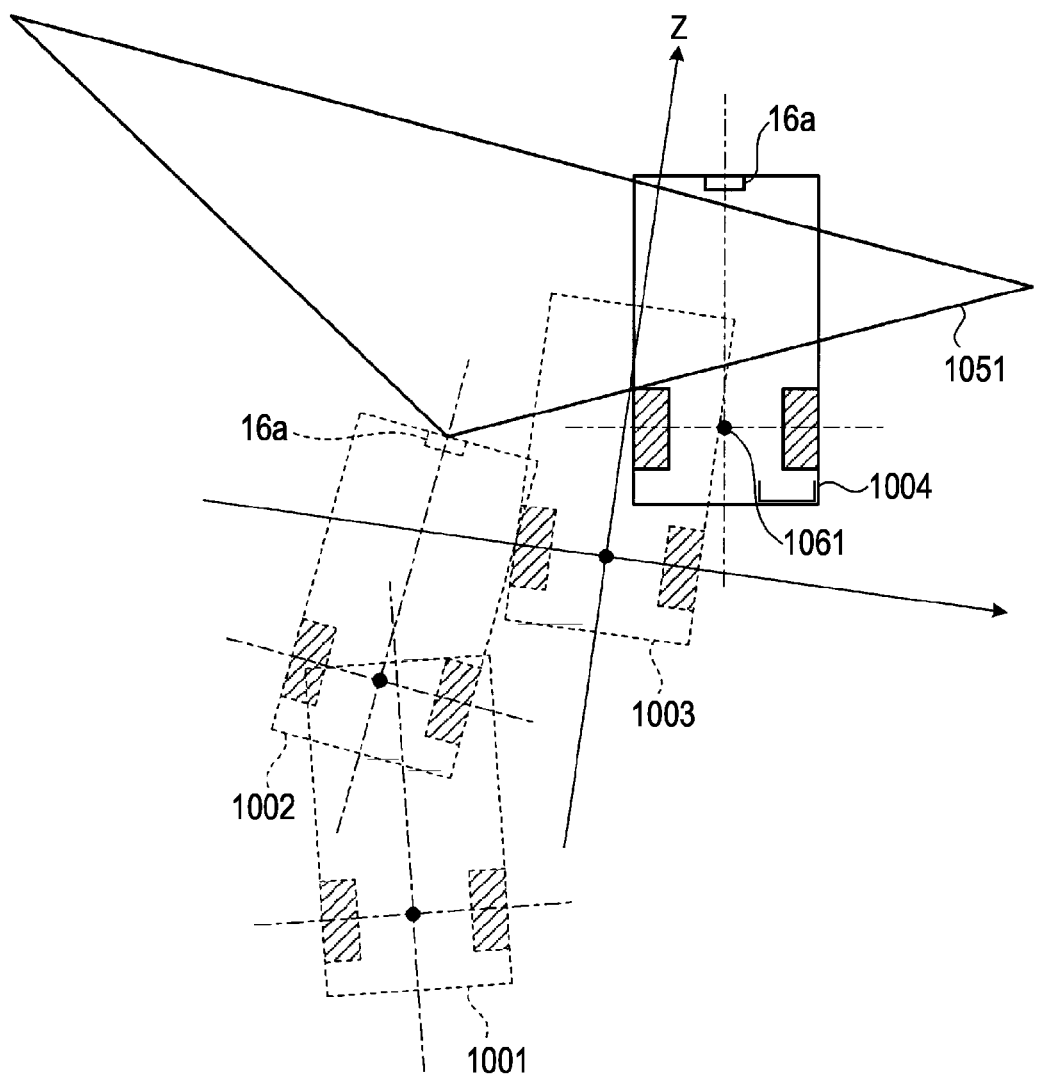
FIG. 10 is a diagram illustrating captured image data which is selected by an image selection section of the periphery surveillance apparatus according to the embodiment.

FIG. 10 is a diagram illustrating the captured image data selected by the image selection section 421 according to this embodiment. In the example illustrated in FIG. 10, the vehicle 1 moves in order of a position 1001, a position 1002, a position 1003, and a position 1004, and the vehicle 1 is currently at the position 1004. It is assumed that a request for performing switching to the underfloor display is received from the driver at the position 1004.

In this case, the image selection section 421 according to this embodiment selects captured image data which will be displayed, from the pieces of captured image data stored in the ring buffer 404 by using a current center 1061 of the rear wheels 3R of the vehicle 1 as a reference. In this embodiment, the image selection section 421 selects captured image data which satisfies a condition. The condition means that a position of the capturing section 16a when shooting (capturing) is performed is in the vicinity of the center 1061 or in the back of the center 1061 and an inclination of the vehicle 1 (in the traveling direction) when shooting (capturing) is performed, against the current traveling direction of the vehicle 1 is in a range of a predetermined angle. The image selection section 421 selects captured image data which was captured at the position 1002 as the position for satisfying such a condition. The road surface in the vicinity of the current front wheels 3F of the vehicle 1 is also included in a capturing region 1051 of the captured image data which was captured at the position 1002. That is, the selected captured image data is set as the past image 808 depicting the underfloor area of the vehicle 1. When the past image 808 is displayed, simply, only the past image 808 may be displayed instead of the present image 801. However, as illustrated in FIG. 9, a contour line 809 indicating the current position of the vehicle 1 may be superimposed and displayed on the past image 808. In this manner, the display processing section 406 superimposes the contour line indicating the current position of the vehicle 1 on the past image 808 and causes a result of superimposition to be displayed, and thus it is possible to cause the driver to easily recognize the current circumstances of the road surface in the vicinity of the front wheels 3F of the vehicle 1.

The movement amount of the vehicle 1 is calculated from when captured image data corresponding to the past image 808 is captured until the captured image data corresponding to the present image 801 is shot (captured), and thus the current position of the vehicle 1 in the past image 808, that is, a superimposition position of the contour line 809 may be determined. The contour line 809 functions as identification information which allows a certain part of the vehicle 1 to be specified. The contour line 809 may include a vehicle body contour line 809a, wheel contour lines 809b, and an axle contour line 809c, for example. The vehicle body contour line 809a indicates an outline of the vehicle 1. The wheel contour lines 809b indicate outlines of the front wheels 3F of the vehicle 1. The axle contour line 809c indicates a position of an axle that connects the right and left front wheels 3F.

The wheel contour line 809b indicating the outline of the front wheel 3F may be set as a contour line based on the current steering angle which is detected by the steering angle sensor 19. Thus, the driver visually recognizes the wheel contour lines 809b and thus can recognize the current direction and the current position of a tire of the vehicle 1. Since the vehicle body contour line 809a, the wheel contour lines 809b, and the axle contour line 809c are superimposed and displayed on the past image 808, the driver can recognize the road surface, and circumstances of the road surface of the underfloor, which includes a road surface in the vicinity of the front wheels 3F or the axle of the vehicle 1. Accordingly, the periphery surveillance section 400 may provide the driver with an environment for performing driving, for example, for avoiding an obstacle in the vicinity of the front wheels 3F. In this manner, it is possible to reduce a driving burden and improve convenience when driving is performed, in this embodiment.

Information superimposed on the past image 808 is not limited to the identification information which allows the certain part of the vehicle 1 to be specified (for example, the vehicle body contour line 809a, the wheel contour line 809b, and the axle contour line 809c). The display processing section 406 according to this embodiment may display a trace (predicted travel trace and wheel traces 806 and 807) in the traveling direction which is obtained based on the current steering angle of the vehicle 1, on the past image 808 in accordance with the request of the driver.

In this embodiment, a selecting method of the captured image data is not limited to the method as illustrated in FIG. 10 and other methods may be used. For example, the image selection section 421 may select the oldest captured image data among pieces of captured image data which are stored in the ring buffer 404 and in which an inclination of the vehicle 1 (in the traveling direction) is in a range of the predetermined angle from the current traveling direction of the vehicle 1. In this case, it is also possible to superimpose the contour line 809 on an appropriate position of the past image 808 based on the selected captured image data by calculating the movement amount of the vehicle 1.

The outputting unit 422 outputs the captured image data which is selected by the image selection section 421, to the display apparatus 8 when selection of the underfloor display is received. Thus, the outputting unit 422 can output captured image data as the past image 808 to the display apparatus 8. The output captured image data is captured image data which was captured previously by the capturing section 16a among the pieces of captured image data stored in the ring buffer 404 and includes a region (underfloor area) at which the vehicle 1 is currently positioned. The outputting unit 422 outputs the present side image 802 in the vicinity of the right side front wheel 3F, the present side image 803 in the vicinity of the left side front wheel 3F of the vehicle 1, and the display area 804 in which the roll angle and the pitch angle are displayed so as to be recognizable, to the display apparatus 8, as illustrated in FIG. 9.

In the example illustrated in FIG. 9, when the past image 808 is displayed, the present side images 802 and 803 represent the current situation of the vehicle 1. That is, the images which are currently shot (captured) by the capturing sections 16b and 16d and depict the current side circumstances of the vehicle 1 are displayed as is. That is, the present side images 802 and 803 (which are obtained based on pieces of side captured image data output from the capturing sections (side capturing section) 16b and 16d for respectively shooting (capturing) the right and left side areas in the vehicle width direction of the vehicle 1) are displayed regardless of switching control between the present image 801 and the past image 808. As a result, even though the past image 808 is being displayed, the past image 808 having a probability of displaying circumstances different from the current surrounding circumstances, for example, even though a pedestrian or an obstacle approaches the sides of the vehicle 1, it is possible to cause the user (driver) to rapidly recognize the approach in real time. When the past image 808 is displayed, the icon 805 for displaying the current roll angle and the current pitch angle relating to the vehicle 1, so as to be recognizable, is displayed. Accordingly, it is possible to easily figure out the current circumstances of the vehicle by displaying the past image 808 and displaying the icon 805, the present side image 802, and the present side image 803 which indicate the current surrounding circumstances of the vehicle 1.

As described above, a shooting region (capturing region) of the present side images 802 and 803 is set so as to include a region of the front wheels 3F of the vehicle 1. That is, a state of the front wheels 3F of the vehicle 1 can be recognized on the screen when the past image 808 is being displayed. Superimposition display is performed on the past image 808 such that the wheel contour lines 809b correspond to the front wheels 3F which are displayed in the present side images 802 and 803. As a result, it is possible to cause the user (driver) to easily figure out display contents of the present image 801 and the past image 808 by using a position of the front wheels 3F of the car (vehicle 1) as a reference.

In a case of FIG. 9, an example in which a direction of the wheel in the wheel contour line 809b which is superimposed on the past image 808 corresponds to a direction of the wheel in the present side images 802 and 803 (the current actual direction of the front wheel 3F) is illustrated. In another embodiment, the direction of the wheel in the wheel contour line 809b which is superimposed on the past image 808 may be fixed (for example, be in a state of traveling straight) and the position of the wheel contour line 809b in the past image 808 may correspond to the position of the wheel in the present side images 802 and 803. In this case, it is possible to simplify the image processing for the wheel contour line 809b which will be superimposed and displayed and to contribute to reducing the burden of the display processing.

As described above, the display processing section 406 functions as the control section for performing display switching between the present image 801 and the past image 808. The display processing section 406 has the permission condition for determining whether or not switching of the screen is permitted, when switching to the past image 808 is required from the user during a period of time of displaying the present image 801 (when a request operation is received through the operation input section 10 and the like). The display processing section 406 has the recovery condition for performing recovery to the present image 801, regardless of whether or not the display requiring operation for the past image 808 is performed by a user when the past image 808 is being displayed.

Regarding the permission condition, it can be determined that the permission condition is established, for example, when both conditions are satisfied, and both of the conditions are the condition defined by a vehicle state and the condition defined by a switching request operation performed by the user (driver). For example, a vehicle stop state (vehicle speed=0 Km/h) may be used as the vehicle state for displaying the past image 808. Since the past image 808 is an image which was captured by the capturing section 16a in the relatively recent past, the screen contents are similar to the present image 801. However, since the past image 808 is a previous image, an image different from the current surrounding circumstances of the vehicle 1 may be displayed in some cases. Both of the present image 801 and the past image 808 are obtained by capturing the region which includes the road surface in the traveling direction of the vehicle 1 and an upward region from the road surface. As a result, an object (for example, a pedestrian or an obstacle) in the present image 801 may be not in the past image 808. Particularly, a probability of changing an existing state of a surrounding object when the vehicle 1 moves after capturing of the past image 808 is performed is greater than that when the vehicle 1 stops. For example, when the user (driver) mistakes the past image 808 for the present image 801, since an object which actually exists does not exist in the past image 808, recognition of the object existing may be delayed. In such a case, if the vehicle 1 stops, at least the vehicle 1 approaching the object can be avoided even though the recognition of the object existing is delayed. Thus, it is possible to suppress occurrence of inconvenience due to delaying the recognition of the object existing. Accordingly, the display processing section 406 performs switching from the present image 801 to the past image 808 when the user requests display of the past image 808 through the operation input section 10 in a state where the vehicle 1 stopping can be confirmed based on a detection result of the wheel speed sensor 22. In other words, the periphery surveillance ECU 14 determines the permission condition for image switching to be established when the condition defined by the switching request operation is established in a state where the condition defined by the vehicle state is established (when a plurality of conditions is satisfied) and the periphery surveillance ECU 14 causes the display processing section 406 to perform processing of performing switching from the present image 801 to the past image 808.

In the above-described example, the condition defined by the vehicle state is described as the "vehicle stop state". In another embodiment, for example, if the vehicle speed reaches an extent (for example, 3 Km/h or less) of allowing an object existing to be sufficiently recognized (the current surrounding circumstances to be recognized), even though the vehicle speed is low, it may be determined that the condition defined by the vehicle state is established and may be determined that the permission condition is established. If there is a case where past images 808 are accumulated in the ring buffer 404 (when the ring buffer 404 is efficient), it is difficult to display the past image 808. Thus, a condition referring to "the ring buffer 404 being efficient" may be added as the condition defined by the vehicle state. The switching request operation performed by the user (driver) may be performed by an operation of, for example, an image switching switch which is provided separately from the operation input section 10, an operation of a smart phone or a remote controller, and the like in addition to an operation performed through the operation input section 10. For example, when the condition which is defined by the vehicle state and means that the vehicle speed is equal to or less than a predetermined speed (for example, vehicle speed=0 Km/h) and the ring buffer 404 is efficient is established, and when the condition which is defined by the switching request operation performed by the operation input section 10 or other switching operations is established, the periphery surveillance ECU 14 may determine the permission condition to be established and cause the display processing section 406 to perform the processing for performing switching from the present image 801 to the past image 808.

In another embodiment, when the condition which is defined by the vehicle state and means that the vehicle speed is equal to or less than a predetermined speed (for example, vehicle speed=0 Km/h) and the ring buffer 404 is efficient is established, the periphery surveillance ECU 14 may cause the operation input section 10 or other switches (push switch, locker switch, and the like) corresponding to image switching, to become active (be efficient). That is, the periphery surveillance ECU 14 causes the operation input section 10 for performing image switching in the display apparatus 8, to be inactive (be inefficient) when the condition defined by the vehicle state is not established. For example, the operation input section 10 for performing image switching in the display apparatus 8 is displayed so as to be translucent or display of the operation input section 10 corresponding to switching is not performed. When a switch corresponding to switching is a mechanical switch such as a push switch and a locker switch, an input may be caused to be not received, and lighting of the switch may turn off or flicker in order to indicate that an operation input is not enabled. On the contrary, when the condition defined by the vehicle state is established, the periphery surveillance ECU 14 causes the operation input section 10 corresponding to switching or other switches to be active and thus allows the switching request operation to be received. When the switching request operation is performed and the condition defined by the switching request operation is established in this state, the periphery surveillance ECU 14 determines the permission condition to be established and causes the display processing section 406 to perform the processing of performing switching from the present image 801 to the past image 808. In this manner, it is determined whether or not the operation input section 10 is caused to be active, based on whether or not the condition defined by the vehicle state is established. Thus, the user can determine whether or not the image switching before the switching request operation is enabled. As a result, it is possible to cause an uncomfortable feeling which refers to that the screen is not switched to be not given to the user regardless of performing of an operation.

As the recovery condition, there is a condition defined by the vehicle state or a condition defined by the switching request operation which is performed by the user (driver). However, in a case of the recovery condition, a configuration in which recovery from the past image 808 to the present image 801 is performed when any one of a plurality of recovery conditions is established is made.

For example, when the speed of the vehicle 1 exceeds the predetermined speed in displaying of the past image 808, the display processing section 406 determines the recovery condition to be established based on only a fact that the speed of the vehicle 1 exceeds the predetermined speed, and performs switching to the present image 801. For example, 3 Km/h and the like may be set to the predetermined speed. In this case, for example, even though the vehicle 1 in stopping moves slightly due to an influence of vibration from the road surface or unevenness of the road surface, and thus a speed is generated, it is possible to prevent oversensitively performing of screen switching. In this manner, when the vehicle 1 starts to travel (move), and it is a necessary for attracting more attention in the current surrounding circumstances of the vehicle 1, rapidly switching to the present image 801 is performed. As a result, it is possible to rapidly provide the user with the current circumstances of the vehicle.

When an underfloor image is displayed as the past image 808, as illustrated in FIG. 9, the contour line 809 is superimposed and thus the current position of the vehicle 1 corresponding to circumstances of the underfloor which is out of a visual field of the user is easily figured out. A superimposition position on the contour line 809 as described above is determined based on comparison of the present image 801 and the past image 808, specifically, the movement amount calculated by using a movement state of a feature point. For this reason, when it is difficult to accurately figure out the movement state of the feature point between the present image 801 and the past image 808, disposition accuracy of the contour line 809 (estimation accuracy in a position of the vehicle 1) is degraded. That is, a display value of the past image 808 is degraded. For example, when captured image data corresponding to the past image 808 is obtained, and then the front wheels 3F of the vehicle 1 ride on a convex portion of the road surface and thus the vehicles is inclined, the capturing section 16*a* may be directed upwardly. In this case, a feature point which has been included in the past image 808 may be not included in the latest captured image data. In this case, the movement amount of the vehicle 1 is incorrectly computed. As a result, it is difficult to cause the contour line 809 to be superimposed and arranged with high accuracy. In this manner, when the estimation accuracy of the vehicle position is equal to or less than a predetermined value, the display processing section 406 determines the recovery condition to be established and switches display of the display apparatus 8 from the past image 808 to the present image 801. When the estimation accuracy of the vehicle position is equal to or less than the predetermined value, it can be considered, for example, that the proportion of feature points, each point of which is used for calculating the movement amount of the vehicle 1 and is mismatched between the past image 808 and the present image 801 exceeds 30% of the total feature points. In this manner, when the estimation accuracy of the position of the vehicle 1 (superimposition accuracy of the contour line 809) is degraded, switching to the present image 801 is rapidly performed, and thus it is possible to suppress an uncomfortable feeling which is given to the user (display of an image of which a display value is decreased), and to rapidly provide the user with the current surrounding circumstances of the vehicle 1. The condition for determining the recovery condition to be established may be applied to a case where it is determined that the estimation accuracy is degraded (to an extent that estimation is difficult), as described above. In addition, the recovery condition may be determined to be established when a quantity of inclination variation of the vehicle 1 is equal to or greater than a predetermined threshold (for example, 5° or) 10°). This predetermined threshold may be set in advance by an experiment and the like. This inclination variation may be detected based on an angle which is calculated by the angle calculating unit 402 or a display angle of the icon 805.

In this manner, when the recovery condition is established, recovery from the past image 808 to the present image 801 is forcibly performed regardless of whether or not the display requiring operation of the past image 808 is performed by the user. Thus, a fail-safe effect of allowing the user (driver) to rapidly figure out the surrounding circumstances of the vehicle 1 can be provided.

The display processing section 406 according to this embodiment switches a display mode such that the user (driver) easily recognizes whether the present image 801 is displayed or the past image 808 is displayed. For example, the present image 801 is displayed in a first display mode and the past image 808 is displayed in a second display mode different from the first display mode. Specifically, a background of the display area of the display apparatus 8 is displayed with colors in the first display mode when the present image 801 is being displayed. In the second display mode, the background of the display area of the display apparatus 8 when the past image 808 is being displayed is displayed in monochrome. In a case of FIG. 8, a background area 810 which is a portion other than the present image 801, the present side images 802 and 803, and the display area 804 is displayed with colors (expressed with white in the drawing). In a case of FIG. 9, the background area 810 which is a portion other than the past image 808, the present side images 802 and 803, and the display area 804 is displayed in monochrome (expressed with hatching in the drawing). In the case of this embodiment, as illustrated in FIG. 8, a background (frame portion) 810a around the present image 801 is displayed so as to stand out (high luminance display, expressed with a bold line in the drawing) when the present image 801 is being displayed. Highlight display (high luminance display) is not performed on the background (frame portion) 810a around the past image 808 when the past image 808 is being displayed (expressed with a thin line in the drawing). In this manner, the user (driver) is caused to intuitively recognize which image is displayed, with ease by using display modes different from each other when the present image 801 is displayed or the past image 808 is displayed. The first display mode and the second display mode which are described above are used as an example. A display mode may be appropriately selected and the similar effect may be obtained as long as the user (driver) is caused to easily determine whether the present image 801 is displayed or the past image 808 is displayed. Discrimination by the background area 810 and discrimination by the surrounding background (frame portion) 810a may be employed together. The similar effect may be obtained event though only one thereof may be employed.

Figure 11:
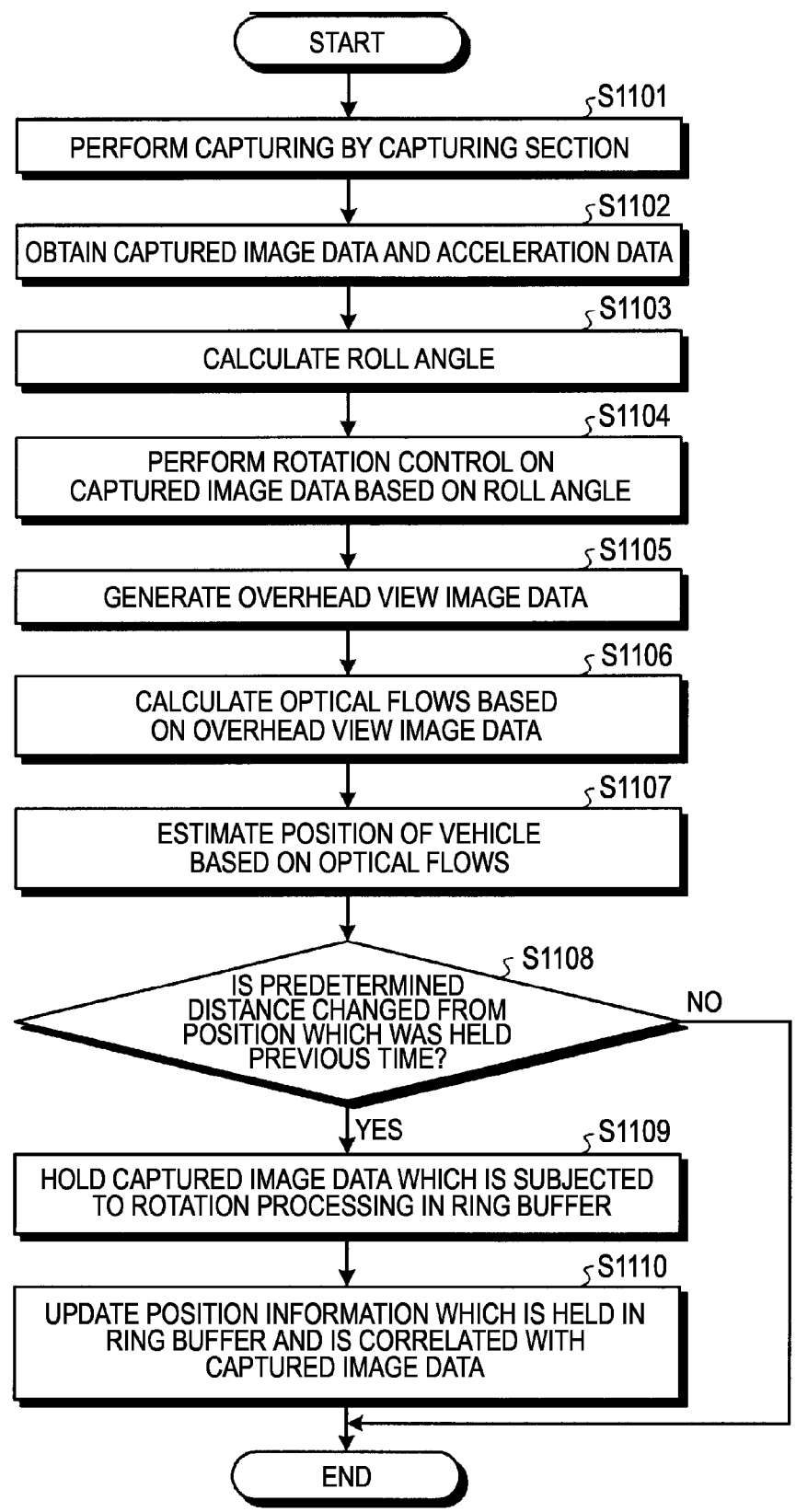
FIG. 11 is a flowchart illustrating procedures of holding processing for the captured image data in the periphery surveillance section of the periphery surveillance apparatus according to the embodiment.

Next, the holding processing of the captured image data in the periphery surveillance section 400 according to this embodiment will be described. FIG. 11 is a flowchart illustrating procedures of the holding processing in the periphery surveillance section 400 according to this embodiment.

First, the capturing section 16 captures surroundings of the vehicle 1 (S1101). Particularly, the capturing section 16a captures the region (region including an upward region from a road surface) including the road surface and the horizontal line in the traveling direction of the vehicle 1.

Then, the obtaining unit 401 obtains captured image data from the capturing section 16 and obtains acceleration data from the acceleration sensor 26 (S1102).

The angle calculating unit 402 calculates the roll angle and the pitch angle of the vehicle 1 based on the acceleration data (S1103).

The rotation control unit 411 performs rotation control on the captured image data in accordance with the roll angle (S1104).

Then, the overhead view image generating unit 412 generates overhead view image data based on the captured image data subjected to the rotation control. The overhead view image data depicts a predetermined region which is around the vehicle 1 in the traveling direction of the vehicle 1, in an overhead view (S1105).

The optical flow calculation section 413 calculates optical flows based on the generated overhead view image data (S1106).

Then, the position estimating unit 414 calculates the movement amount of the vehicle 1 and estimates the current position of the vehicle 1 based on the calculated optical flows (S1107).

The holding unit 415 determines whether or not at least one of a predetermined distance (for example, 0.3 m or 0.5 m) and a predetermined angle (for example, 2 deg) is changed from the position which was held the previous time (S1108). When it is determined that at least one of the predetermined distance and the predetermined angle is not changed (No in S1108), processing is ended. In this embodiment, an example in which holding is performed when at least one of the predetermined distance and the predetermined angle is changed is described. However, it is not limited to such a holding method and holding and the like may be performed at a predetermined interval.

When the holding unit 415 determines that at least one of the predetermined distance (for example, 0.3 m or 0.5 m) and the predetermined angle (for example, 2 deg) is changed from the position which was held the previous time (Yes in S1108), the holding unit 415 rewrites and holds the current captured image data which is subjected to rotation processing, in an area of the ring buffer 404 which was updated longest time ago (S1109). At this time, the holding unit 415 correlates an inclination (in the traveling direction) and position information when the captured image data was obtained, with each other and holds a result of correlation.

Then, the holding unit 415 updates the position information when the captured image data stored in the ring buffer 404 was obtained to position information which is obtained by using the current position as a reference (origin) (S1110). It is possible to prevent overflow of the ring buffer 404 and hold position information continuously by the update.

The periphery surveillance section 400 according to this embodiment may provide the captured image data stored in the ring buffer 404 as image data (past image 808) at a time of underfloor display.

Figure 12:
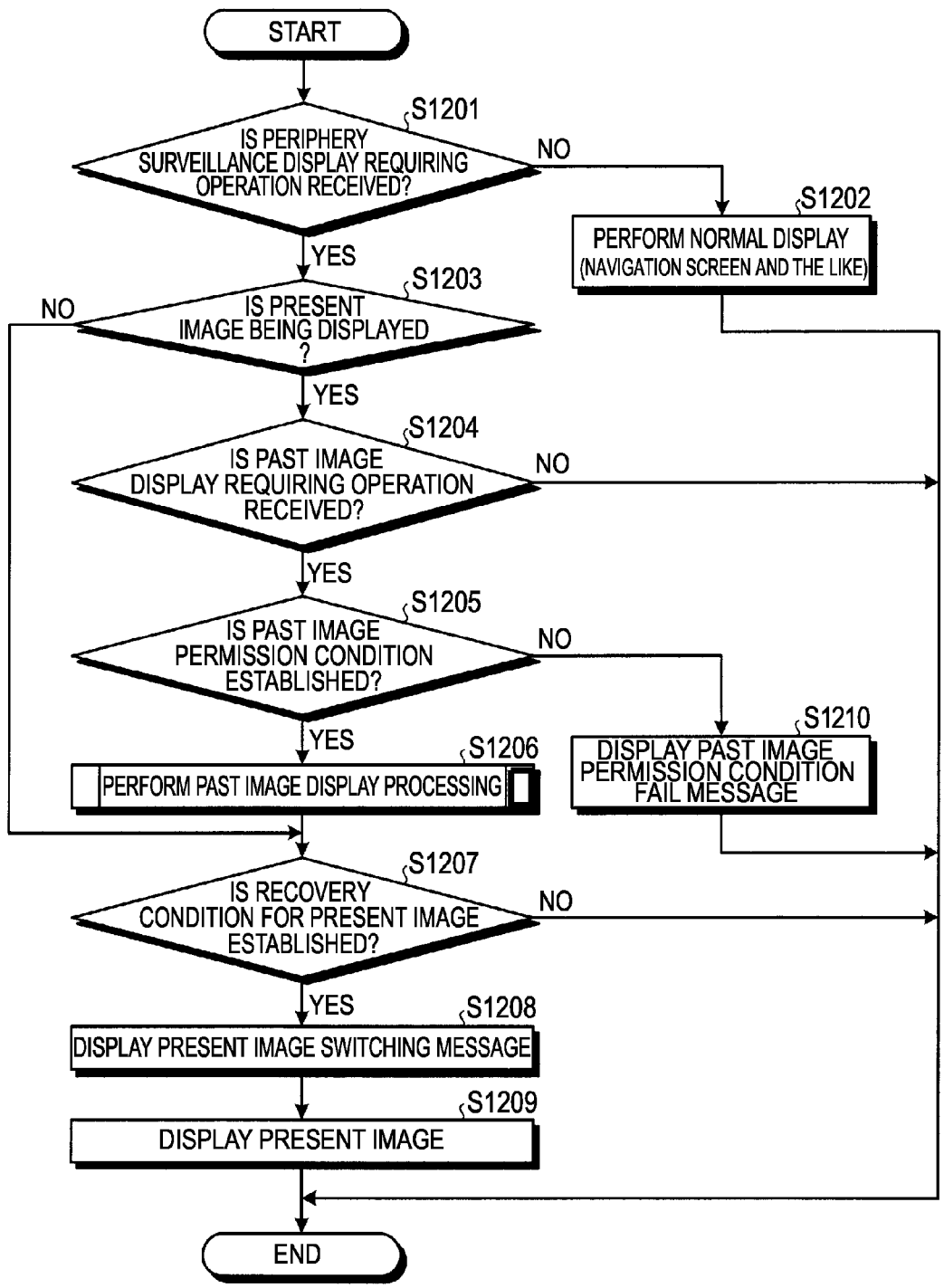
FIG. 12 is a flowchart illustrating procedures of the display processing in the periphery surveillance section of the periphery surveillance apparatus according to the embodiment.

Next, the display processing in the periphery surveillance section 400 according to this embodiment will be described. FIG. 12 is a flowchart illustrating procedures of the display processing of performing switching between the present image 801 and the past image 808 in the periphery surveillance section 400 according to this embodiment.

First, the display processing section 406 in the periphery surveillance section 400 determines whether or not a periphery surveillance display requiring operation for the vehicle 1 is received through the receiving unit 405 and the like (S1201). When the periphery surveillance display requiring operation is not received (No in S1201), the display processing section 406 performs normal display, for example, display of a navigation screen, an audio screen, and the like (S1202), in the display apparatus 8. Then, this flow is temporarily ended.

When the display processing section 406 receives the periphery surveillance display requiring operation in S1201 (Yes in S1201), the display processing section 406 confirms whether or not the present image 801 is being displayed (S1203). When the present image 801 is being displayed (Yes in S1203), the display processing section 406 determines whether or not a past image display requiring operation is received through the receiving unit 405 (S1204). When the display processing section 406 receives the past image display requiring operation in S1204 (Yes in S1204), if the permission condition for displaying the past image 808 is established (Yes in S1205), the display processing for the past image 808 is performed (S1206).

Figure 13:
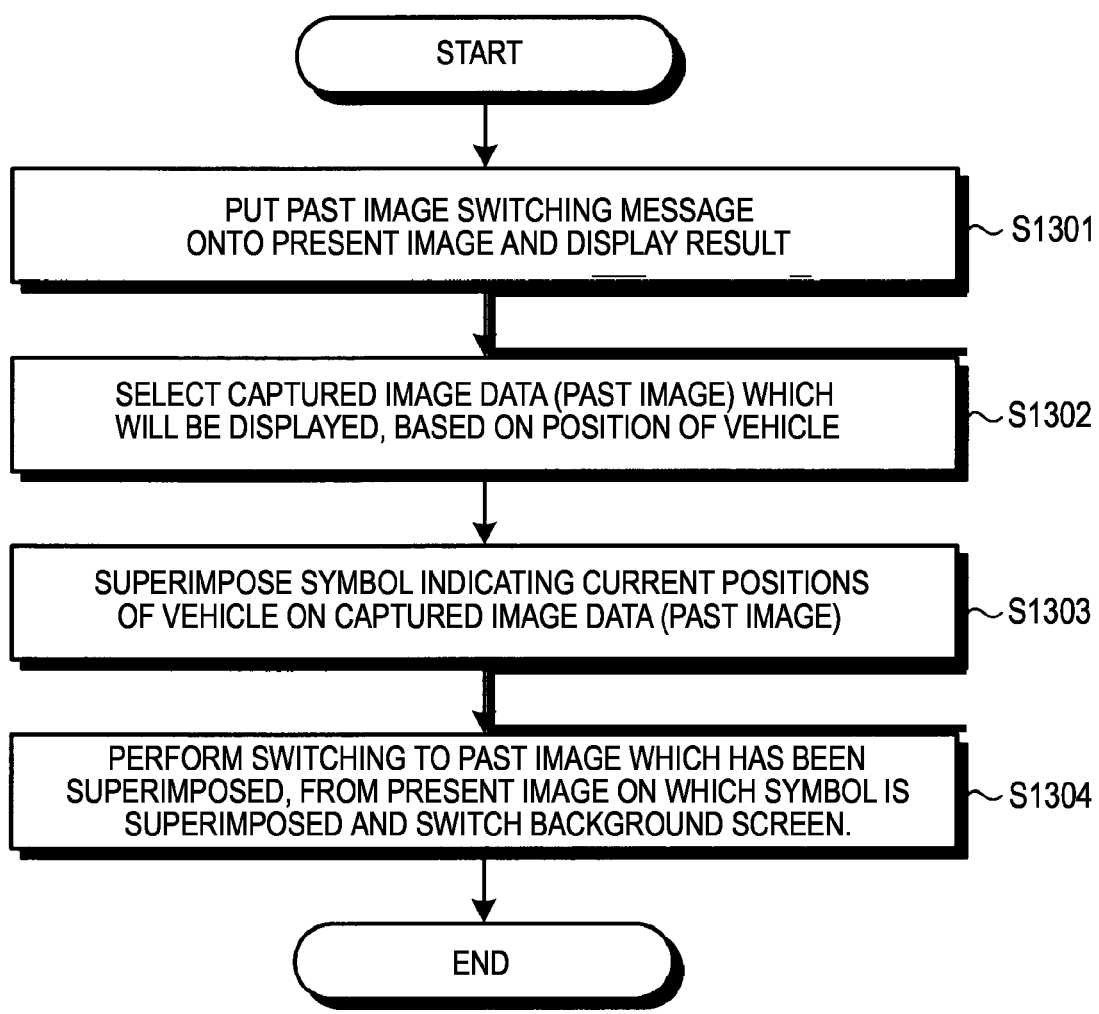
FIG. 13 is a flowchart illustrating procedures of the display processing for the past image in the periphery surveillance section of the periphery surveillance apparatus according to the embodiment.
Figure 14:
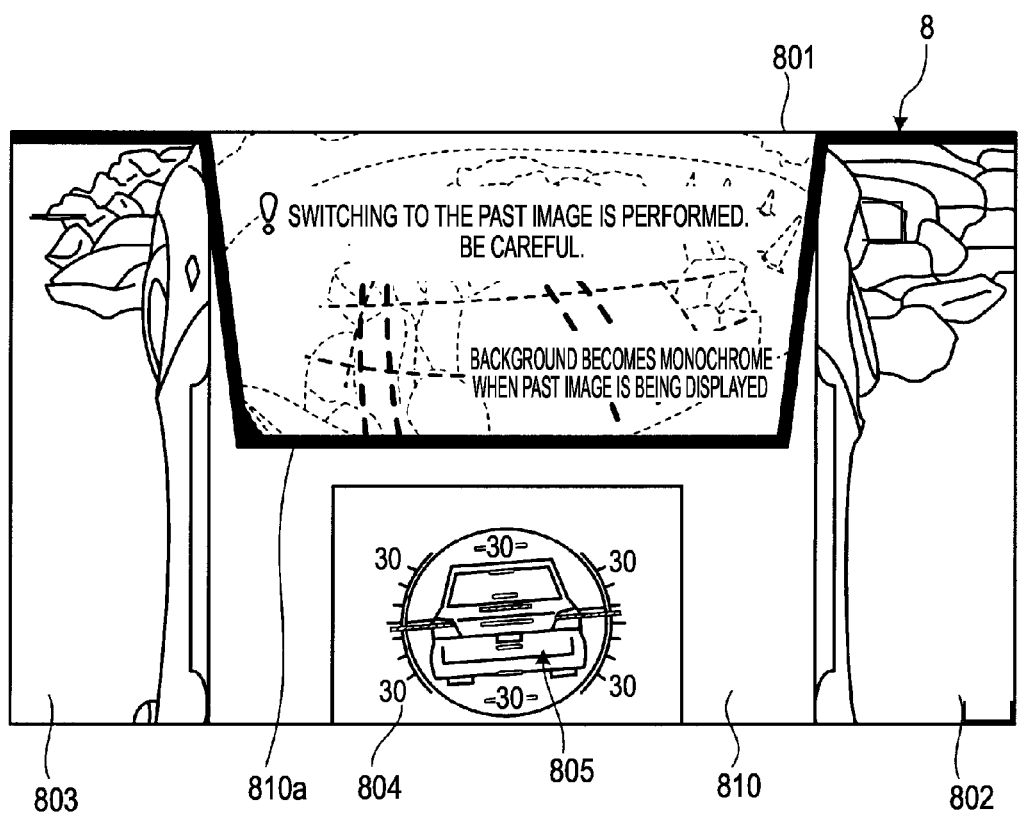
FIG. 14 is a diagram illustrating a screen example for an example of a message which is displayed when switching from the present image to the past image is performed, in the periphery surveillance apparatus according to the embodiment.

FIG. 13 is a flowchart illustrating the display processing for the past image 808 in S1206 in detail. When switching to the past image 808 is permitted, for example, when the vehicle 1 is in a stop state and a request for the past image 808 is received through the receiving unit 405, the display processing section 406 puts a message indicating switching to the past image 808 onto a display screen of the present image 801 which is being displayed and displays a result of putting the message through the display apparatus 8 (S1301). The display processing section 406 displays a switching message on the present image 801 and the switching message includes a message of "! Switching to the past image is performed. Be careful.", "the background becomes monochrome in displaying the past image", and the like, for example, as illustrated in FIG. 14. In the example of FIG. 14, the present image 801 is displayed so as to be translucent (expressed with a dot line in the drawing). However, only the switching message may be displayed without displaying of the present image 801. The switching message may be displayed so as to be caused to stand out, for example, flicker. A sound message having the similar details may be output through the sound output apparatus 9 along with displaying of the switching message. In this manner, providing of the switching message enables calling of attention to the user (driver). The above-described switching message may disappear after display for several seconds, for example, two seconds. In addition, the switching message may disappear by an operation of the user (driver). In this case, since the user is required to perform an operation for eliminating the message, it is possible to cause the user to reliably recognize switching of the screen.

When this switching message is being provided or before this switching message is provided, the image selection section 421 selects captured image data which will be displayed as the past image 808 among the pieces of captured image data stored in the ring buffer 404, based on the current position of the vehicle 1 (S1302). The display processing section 406 superimposes a symbol (contour line 809) indicating the current position of the vehicle 1 on the selected captured image data (past image 808) (S1303). In this case, a direction of the wheel contour line 809b may be changed based on the current direction (steering angle) of the front wheels 3F provided from the steering angle sensor 19. The outputting unit 422 switches display contents of the display apparatus 8 from the present image 801 to the past image 808 (underfloor image) on which the symbol (contour line 809) has been superimposed, and switches the background screen (background area 810) to a predetermined screen, for example, a monochrome screen (S1304). The display processing section 406 displays the same image (image depicting the current surrounding circumstances and a situation of the vehicle 1) as that when the present image 801 is displayed, in the display area 804 including the present side images 802 and 803 and the icon 805, even though switching to the past image 808 is performed. Accordingly, the user (driver) can recognize the current surroundings (side circumstances) of the vehicle and easily obtain information regarding the underfloor.

Figure 15:
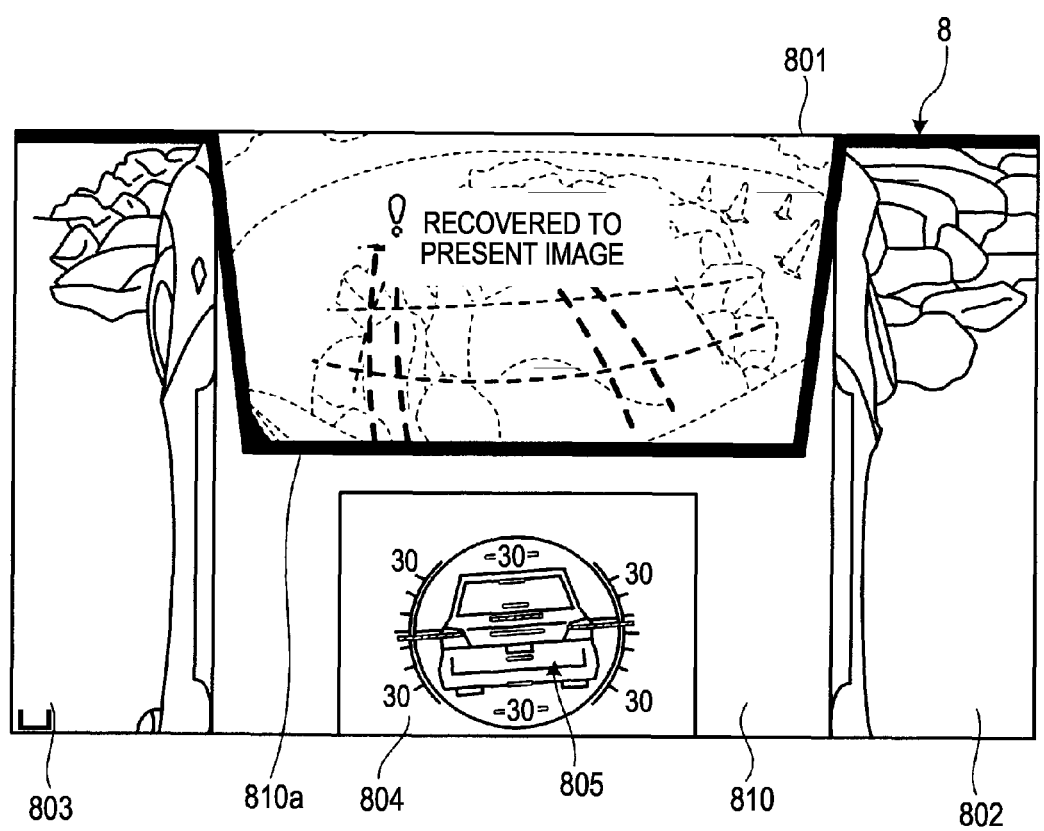
FIG. 15 is a diagram illustrating a screen example for an example of the message which is displayed when switching from the past image to the present image is performed, in the periphery surveillance apparatus according to the embodiment.

Returning to FIG. 12, if displaying of the past image 808 is complete, the display processing section 406 determines whether or not the recovery condition for the present image 801 is established (S1207). As described above, when any recovery condition is established (Yes in S1207), for example, when the speed of the vehicle 1 is equal to or greater than the predetermined speed or when estimation of the position of the vehicle 1 is insufficiently performed, the display processing section 406 displays a switching message indicating recovery to the present image 801 (S1208), and displays the present image 801 (S1209). FIG. 15 illustrates an example of the switching message indicating recovery to the present image 801. In FIG. 15, the switching message of "! Recovery to the present image has been performed" and the like is superimposed and displayed on the translucent present image 801 (expressed with a dot line in the drawing). In this case, a sound message having the similar details may be output through the sound output apparatus 9 with displaying of the switching message. In another example, before switching display of the present image 801, only the switching message may be displayed. The above-described switching message may disappear after display for several seconds, for example, two seconds. In addition, the switching message may disappear by an operation of the user (driver). In this case, since the user is required to perform an operation for eliminating the message, it is possible to cause the user to reliably recognize switching of the screen.

When the outputting unit 422 outputs the present image 801 and then the vehicle 1 moves, the outputting unit 422 changes (displays in an animation manner) the estimated wheel traces 806 and 807 of the front wheels 3F based on detection information provided from the steering angle sensor 19, with moving of the vehicle 1. Accordingly, the driver can recognize the current position of the vehicle 1, a direction of traveling and the like.

When the recovery condition for the present image 801 is not established in S1207 (No in S1207), the display processing section 406 maintains display of the past image 808. The display processing section 406 ends temporarily this flow and performs preparation for the next switching timing.

Figure 16:
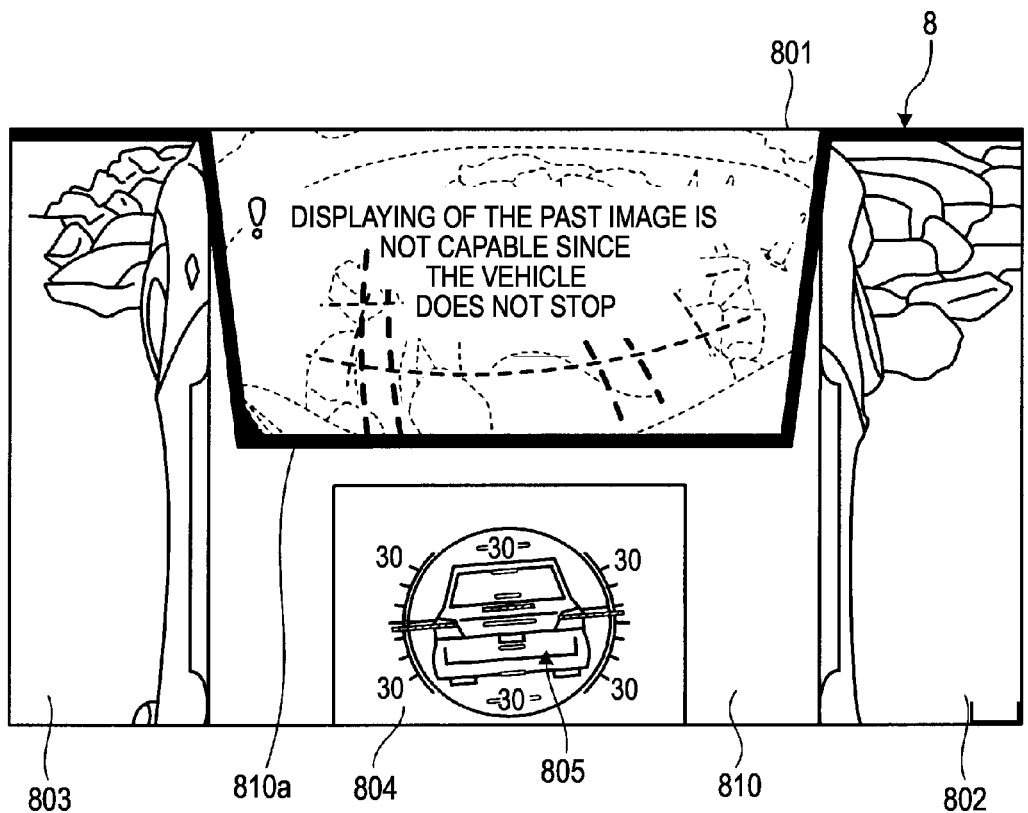
FIG. 16 is a diagram illustrating a screen example for an example of the message which is displayed when switching from the present image to the past image is unallowable, in the periphery surveillance apparatus according to the embodiment.

When the permission condition for performing switching to the past image 808 is not established in S1205 (No in S1205), the display processing section 406 superimposes and displays a fail message on the present image 801 (S1210), and the fail message indicates that a display permission condition of the past image 808 fails. The display processing section 406 maintains display of the present image 801 and temporarily ends this flow. FIG. 16 illustrates a display example of the fail message. For example, a message of "! Displaying of the past image is not capable since the vehicle does not stop" and the like is superimposed and displayed on the translucent present image 801 (expressed with a dot line in the drawing). In this case, a sound message having the similar details may be output through the sound output apparatus 9 with displaying of the fail message. The fail message in this case may also disappear after display for several seconds, for example, two seconds. In addition, the fail message may also disappear by an operation of the user (driver). In this case, since the user is required to perform an operation for eliminating the message, it is possible to cause the user to reliably recognize that the past image 808 is not displayed.

When it is determined that the display processing section 406 does not receive the display requiring operation of the past image 808 in S1204 (No in S1204), the display processing section 406 maintains display of the present image 801 and temporarily ends this flow.

When the present image 801 is not being displayed in S1203 (No in S1203), that is, when the past image 808 is being displayed, the process proceeds to S1207 and processes subsequent to S1207 are executed. As a case where the present image 801 is not being displayed in S1203, there is a case where normal display is being performed (the current navigation image screen or the audio screen is being displayed) in addition to a case where the past image 808 is displayed. In this case, the process also proceeds to S1207. The display processing section 406 may have a present image display condition along with a present image recovery condition in the process of S1207. For example, when the periphery surveillance display requiring operation is received during a period of time when normal display is performed, display of the present image 801 may be permitted. As a condition for performing switching to the present image 801 when normal display is being performed, a condition that the vehicle 1 has a speed equal to or less than the predetermined speed at a time of switching request, or a condition that the vehicle 1 stops at the time of switching request may be included.

In this manner, according to this embodiment, different conditions are provided for cases, the cases being a case where switching from the present image 801 to the past image 808 is performed, and conversely a case switching from the past image 808 to the present image 801 is performed, and display switching is performed only when a certain condition among the conditions is established. As a result, the present image 801 and the past image 808 may be displayed in environments (state of the vehicle 1) respectively suitable for the present image 801 and the past image 808 and may be provided for the user (driver). Particularly, when switching from the past image 808 to the present image 801 is performed, if the recovery condition is established, forcible recovery to the present image 801 is performed regardless of an operation of the user (driver). Accordingly, the present image 801 depicting the current surroundings of the vehicle 1 is displayed in the display apparatus 8 and thus it is possible to be appropriately used by the user (driver). That is, it is possible to improve an extent of figuring out the surrounding circumstances of the vehicle 1 and improve handling of the display image. Even though the display screen is switched from the present image 801 to the past image 808 or is switched from the past image 808 to the present image 801, an image defined by the permission condition or the recovery condition, that is, a screen suitable for the current condition is displayed. Thus, it is possible to cause the user to not have an uncomfortable feeling relating to the screen which is currently displayed.

In this embodiment, the display processing is performed on the above-described captured image data, and thus it is possible to display a blind area (for example, underfloor area) at the current position of the vehicle 1, in the display apparatus 8. With this, it is possible to cause the driver to figure out the surrounding circumstances and to reduce driving burden.

In this embodiment, the captured image data which was obtained by shooting (capturing) the region including the road surface and the horizontal line and is image data at a so-called inclined viewpoint is displayed. In this case, when the vehicle travels on a road surface having an unevenness, that is, travels on a so-called off-road, it is possible to figure out the circumstances of the road surface and to reduce driving burden in comparison to a case where the overhead view image data is displayed.

In this embodiment, the position of the vehicle 1 is estimated in accordance with the calculated optical flows. With this, when the vehicle travels on the off-road and the like, even though the wheels 3 slip, it is possible to estimate the position of the vehicle 1 with high accuracy.

In the above-described embodiment, regarding captured image data which is output by the outputting unit 422 and is used for the underfloor display, if the road surface corresponding to the current position of the vehicle 1 is included in the captured image data, the position of the vehicle 1 at which capturing is performed is not limited and capturing may be performed at any position. Captured image data which is captured at only a certain (one) position may be used in the underfloor display, and composition obtained by composing multiple pieces of image data which are respectively captured at a plurality of positions may not be used. For example, an image from the capturing section 16*a* is displayed itself as the present image 801 without processing of the image. Similarly, an image of the capturing section 16*a* may be used as the past image 808 stored in the ring buffer 404 without processing of the image. With this, it is possible to reduce burden of the image processing.

In this embodiment, an example in which the multiple pieces of captured image data are stored in the ring buffer 404, and captured image data which will be displayed is selected from the multiple pieces of captured image data is described. However, only the captured image data which was captured the previous time may be displayed. In this case, since only one piece of captured image data may be stored, it is possible to reduce a storage capacity.

Figure 17:
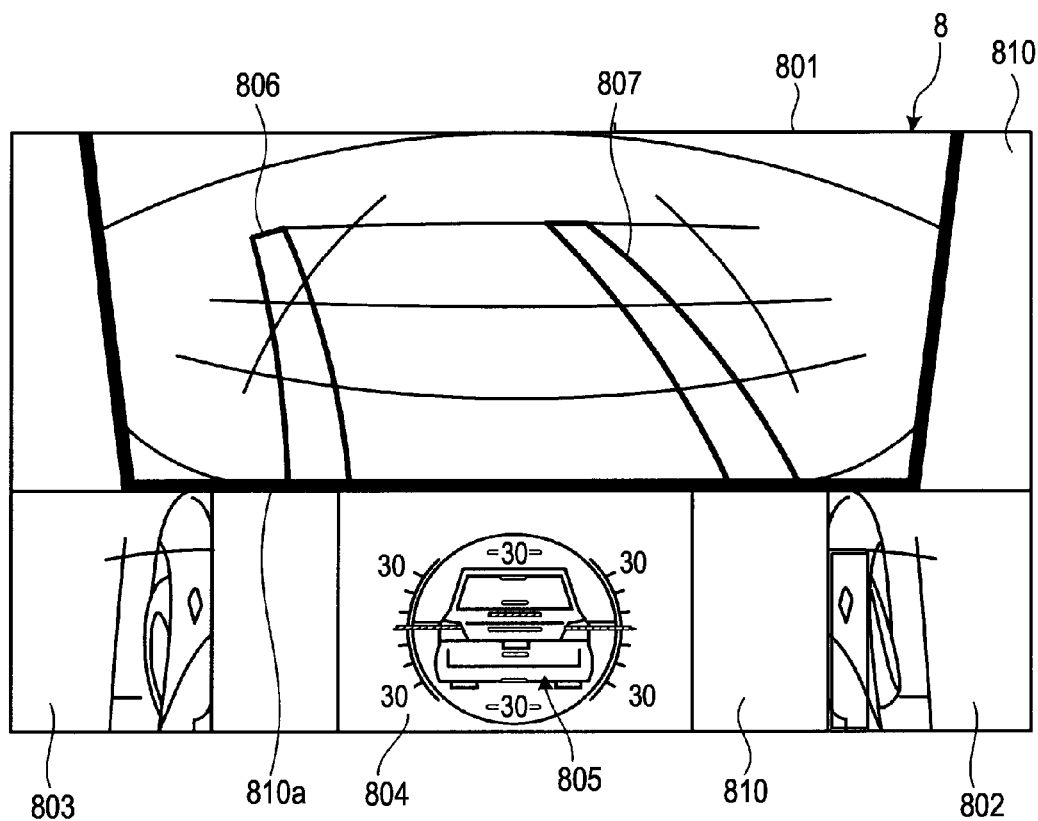
FIG. 17 is a diagram illustrating a screen modification example including the present image which is subjected to the display processing and which is performed by the display processing section of the periphery surveillance apparatus according to the embodiment.
Figure 18:
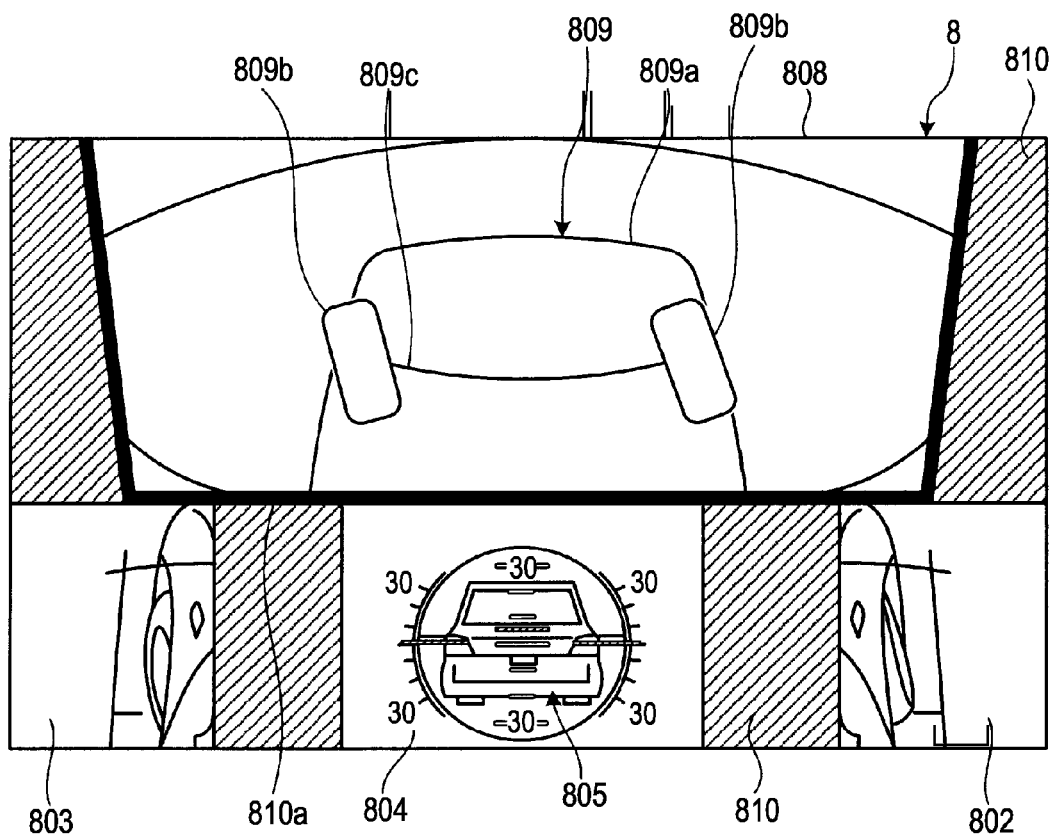
FIG. 18 is a diagram illustrating a screen modification example including the past image (underfloor image) which is subjected to the display processing and which is performed by the display processing section of the periphery surveillance apparatus according to the embodiment.

FIG. 17 is a diagram illustrating a modification example of a screen including the present image 801 which is subjected to the display processing by the display processing section 406 of the periphery surveillance apparatus. Similarly, FIG. 18 is a diagram illustrating a modification example of a screen including the past image 808 which is subjected to the display processing by the display processing section 406 of the periphery surveillance apparatus. FIG. 17 corresponds to FIG. 8 and FIG. 18 corresponds to FIG. 9. FIGS. 17 and 18 have substantially the same display contents as those in FIGS. 8 and 9. However, the sizes of the display area in the present image 801, the past image 808, and the present side images 802 and 803 illustrated in FIGS. 17 and 18 are different from the sizes of the display area in the images 801, 808, 802 and 803 illustrated in FIGS. 8 and 9. Since only the sizes of the display area in the images between FIG. 17 and FIG. 8 and between FIG. 18 and FIG. 9 are different from each other, and the display contents are the same, the same reference signs are denoted in FIG. 17 and FIG. 8, and in FIG. 18 and FIG. 9, and descriptions thereof will be omitted.

As illustrated in FIGS. 17 and 18, the length of the display area of the present side images 802 and 803 in a longitudinal direction is reduced, and thereby the length of the display area of the present image 801 and the past image 808 in a transverse direction is increased. As a result, it is possible to improve visibility of the present image 801 and the past image 808. When the display area of the present side images 802 and 803 as illustrated in FIGS. 8 and 9 becomes large, it is possible to improve visibility for the sides of the vehicle.

In the above-described embodiment, an example in which the periphery surveillance section 400 estimates the position of the vehicle 1 based on the optical flows is described. However, position estimation is not limited to estimation of the position by using the optical flow. For example, a sensor that detects the number of revolutions of the wheel 3 and estimates the movement amount may be used, or the position and the movement amount of the vehicle 1 may be detected by using a GPS and the like. In this case, it is also possible to obtain the similar effect to this embodiment.

FIGS. 8, 9, and the like illustrate a case where the vehicle 1 travels (stops) on the off-road. However, this embodiment may be applied to a case where the vehicle 1 travels (stops) on an on-road, and it is also possible to obtain the similar effect.

In the above-described embodiment, all of the display areas (see FIGS. 8 and 9) showing the front region are disposed at an upper part in the center of the display apparatus so as to be substantially trapezoid (trapezoid shape, substantially trapezoid display area, trapezoid display area) in which a short side is disposed on a lower side. In this manner, display in the front display area may look like a standing screen having a depth feeling by performing display in the area having a shape in which the short side is disposed on the lower side. As a result, a display similar to the actual surrounding circumstances which are visually recognized by the user (driver and occupant) may be realized. In addition, the shape of side display areas (in the embodiment, substantially rectangular display area) is different from the shape of the front display area. Images obtained by shooting (capturing) a region on the left side of the vehicle and a region of the right side thereof in the vehicle width direction are displayed on the side display areas. As a result, emphasis may be performed such that areas for displaying the side regions and an area for displaying the front region, which are displayed on the same screen, have different viewpoints (for example, the front region is shown on the standing screen, and the side region is shown on a looking-down screen). Accordingly, it is possible to contribute to improvement of visibility of the user.

In the embodiment, the side display area does not include a region over the road surface. As the substantially trapezoid display area, a trapezoid display area in which each side is formed with a straight line may be applied, or a trapezoid display area in which any one of sides is formed with a curved line may be applied. For example, in FIG. 8, the substantially trapezoid display area may be formed with a convex curved line such that a long side of the area in which the present image 801 is displayed is directed to the outside of the area. Similarly, the substantially trapezoid display area may be formed with a convex curved line such that a short side of the area in which the present image 801 is displayed is directed to the outside of the area. In addition, the substantially trapezoid display area may be formed with a convex curved line such that a side (oblique side) of the area in which the present image 801 is displayed is directed to the outside of the area. Conversely, the substantially trapezoid display area may be formed with a convex curved line such that a side (oblique side) of the area in which the present image 801 is displayed is directed to the inside of the area. For example, the substantially trapezoid shape in this embodiment may include a fan shape which is formed with a convex curved line such that the long side is directed to the outside of the area and the short side is directed to the inside of the area. The above-described curved line may be applied to a portion of the substantially trapezoid shape or may be applied to a plurality of portions thereof. It is possible to cause the shape of the display area to have various designs by forming the side constituting the substantially trapezoid shape with a curved line. It is possible to improve discriminability between the substantially trapezoid display area and the substantially rectangular display area which is the side display area.

In the periphery surveillance section 400 according to the above-described embodiment, when selection for the under-floor display is received, only captured image data which was obtained by the capturing section 16a performing capturing at a certain position of the vehicle 1 in the past is displayed. That is, in the above-described embodiment, an example in which multiple pieces of captured image data which are different from each other in time series, such as the present captured image data and the past captured image data, are not composed is described. In this manner, since the multiple pieces of image data which are different from each other in time series are not composed, it is possible to reduce processing burden.

As described above, in the periphery surveillance apparatus according to this embodiment, for example, the display processing section 406 (control section) displays the wheel traces 806 and 807 (predicted travel trace) of the wheels 3 (the wheel traces corresponding to wheel images which are included in the present side images 802 and 803) on the present image 801 when the present image 801 is displayed. The display processing section 406 displays the wheel positions corresponding to the wheel images which are included in the present side images 802 and 803, on the past image 808 when the past image 808 is displayed. According to this configuration, it is possible to cause the user to easily figure out the display contents of the present image 801 and the past image 808 by using the wheel position of the vehicle as a reference, for example.

As described above, in the periphery surveillance apparatus according to this embodiment, for example, the periphery surveillance ECU 14 (control section) determines one condition to be established when the vehicle speed of the vehicle is equal to or less than the predetermined speed. The condition is one among conditions for establishing the permission condition which permits switching from the present image 801 to the past image 808. According to this configuration, it is possible to suppress switching to the past image 808 when the vehicle moves at a speed exceeding the predetermined speed.

As described above, in the periphery surveillance apparatus according to this embodiment, for example, the periphery surveillance ECU 14 (control section) determines the permission condition for permitting switching from the present image 801 to the past image 808 to be established when the condition defined by the vehicle state and the condition defined by the switching request operation are established, and the periphery surveillance ECU 14 causes the operation input section (operation section) 10 which is operated in order to establish the condition defined by the switching request operation, to be active (efficient) under a condition that the condition defined by the vehicle state is established. In this manner, it is determined whether or not the operation input section 10 is caused to be active, based on whether or not the condition defined by the vehicle state is established, and thus it is possible to cause the user to determine whether or not the image switching is enabled, before the switching request operation. As a result, it is possible to cause an uncomfortable feeling which refers to that the screen is not switched to be not given to the user regardless of performing of an operation.

A periphery surveillance apparatus according to an aspect of this disclosure includes: a storage section that stores captured image data output from a capturing section for capturing an image of a region including a road surface and a region upward from the road surface, in a traveling direction of a vehicle; a display section that selectively displays at least one of a past image and a present image among pieces of captured image data which are stored in the storage section, the past image based on captured image data corresponding to a current underfloor area of the vehicle, and the present image based on new captured image data which is captured and output by the capturing section; and a control section that performs switching to the past image when a permission condition for permitting display of the past image is established during a time when the present image is displayed in the display section and performs switching to the present image when a recovery condition for performing recovery to the present image is established during a time of displaying the past image is displayed in the display section. With this configuration, when a past image in which an underfloor area is included is displayed, if a permission condition is established such that an influence on driving becomes small even though the past image is displayed, a present image which has been displayed is switched to a past image. Similarly, when a recovery condition is established during a time of displaying the past image, the past image is switched to the present image. That is, since an image defined by the permission condition or the recovery condition (that is, a screen suitable for the current condition) is displayed even though a display screen is switched from the present image to the past image, or is switched from the past image to the present image, there is an advantage in that a comfortable feeling regarding a screen on which displaying is currently performed can be applied to a user.

In the periphery surveillance apparatus, for example, the control section may perform switching to the present image regardless of whether or not a display requiring operation for the past image is performed by a user, when the recovery condition is established. Thus, for example, when the control section determines that recovery to the present image is necessary, switching to the present image can be rapidly performed. Accordingly, there is an advantage in that the current circumstances of a vehicle can be shown to the user.

In the periphery surveillance apparatus, for example, the control section may determine the recovery condition to be established and may perform switching to the present image when a vehicle speed exceeds a predetermined speed during the time of displaying the past image. Thus, for example, when a vehicle starts to travel and thus paying attention to variation in the current circumstances of the vehicle is required, switching to the present image is rapidly performed. Accordingly, there is an advantage in that the current circumstances of a vehicle can be rapidly shown to the user.

In the periphery surveillance apparatus, for example, the control section may estimate a current vehicle position based on the captured image data stored in the storage section and new captured image data output from the capturing section, when the past image is displayed, and superimposes an image indicating the estimated vehicle position on the past image so as to display a result of superimposition, and the control section may determine the recovery condition to be established when estimation accuracy for the vehicle position is equal to or less than a predetermined value, and may perform switching to the present image. Thus, for example, the current vehicle position which is estimated is superimposed on the past image, and thus a situation of the underfloor which is out of a visual field of the user is easily recognized. In addition, the position of the underfloor and the current vehicle position are easily recognized. Conversely, when estimation accuracy for the current vehicle position is degraded, recognizing of the position of the underfloor and the current vehicle position is difficult and thus the uncomfortable feeling may be applied. Accordingly, when the estimation accuracy is degraded, switching to the present image is rapidly performed, and thus there is an advantage in that the uncomfortable feeling applied to the user can be suppressed and the current circumstances of the vehicle can be rapidly shown to the user.

In the periphery surveillance apparatus, for example, the control section may cause the present image to be displayed in a first display mode and may cause the past image to be displayed in a second display mode different from the first display mode. Thus, for example, there is an advantage in that an image being displayed is easily distinguished between the present image and the past image.

In the periphery surveillance apparatus, for example, the display section may display the present image or the past image together with a present side image based on side captured image data outputted from a side capturing section that captures images of right or left side region of the vehicle in a vehicle width direction, regardless of controlling for switching between the present image and the past image. Thus, for example, the present side image is displayed, and thereby variation in circumstances on sides of the vehicle can be shown to the user in real time even though the present image or the past image is being displayed. As a result, there is an advantage in that the circumstances (presence of an object or approaching of an object) on the sides of the vehicle can be rapidly shown to the user.

In the periphery surveillance apparatus, for example, the control section may cause images which have substantially the same viewpoint and field angle to be displayed as the present image and the past image. Thus, for example, since captured image data which is obtained as the present image by performing capturing can be used as the past image as it is, there is an advantage in that image display processing can be simplified. In addition, there is an advantage in that contents of the present image and contents of the past image can be easily correlated and it is possible to contribute to the improvement of recognition of the user between the present image and the past image.

A periphery surveillance apparatus according to another aspect of this disclosure includes: a storage section that stores captured image data output from a capturing section for capturing an image of a region including a road surface and a region upward from the road surface, in a traveling direction of a vehicle; a display section that selectively displays at least one of a past image and a present image among pieces of captured image data which are stored in the storage section, the past image based on captured image data corresponding to a current underfloor area of the vehicle, and the present image based on new captured image data which is captured and output by the capturing section; and a control section that causes displaying to be performed in a first display mode when the present image is displayed, and causes an image having substantially the same viewpoint and field angle as the present image to be displayed in a second display mode different from the first display mode when the past image is displayed. With this configuration, for example, there is an advantage in that an image being displayed is easily distinguished between the present image and the past image. In addition, since captured image data which is obtained as the present image by performing capturing can be used as the past image as it is, there is an advantage in that image display processing can be simplified. Correlating of the contents of the present image and the contents of the past image can be easily performed for the user, and thus there is an advantage in that it is possible to contribute to the improvement of recognition of the user between the present image and the past image.

The embodiment and the modification example are described. However, these embodiment and modification example are described by way of example only and not intended to limit the scope of this disclosure. These new embodiments may be implemented as other various examples, and various omissions, replacements, changes may be applied in a range without departing from a gist of this disclosure. These embodiment and modification are included in the scope or the gist of this disclosure and included in the invention described in the appended claims and an equivalent range thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery surveillance apparatus comprising:
   a storage section that stores captured image data output from a capturing section for capturing an image of a region including a road surface and a region upward from the road surface, in a traveling direction of a vehicle;
   a display section that selectively displays at least one of a past image and a present image among pieces of captured image data which are stored in the storage section, the past image based on captured image data corresponding to a current underfloor area of the vehicle, and the present image based on new captured image data which is captured and output by the capturing section; and
   a control section that performs switching to the past image when a permission condition for permitting display of the past image is established during a time when the present image is displayed in the display section and performs switching to the present image when a recovery condition for performing recovery to the present image is established during a time of displaying the past image is displayed in the display section.

2. The periphery surveillance apparatus according to claim 1, wherein
   the control section performs switching to the present image regardless of whether or not a display requiring operation for the past image is performed by a user, when the recovery condition is established.

3. The periphery surveillance apparatus according to claim 1, wherein
   the control section determines the recovery condition to be established and performs switching to the present image when a vehicle speed exceeds a predetermined speed during the time of displaying the past image.

4. The periphery surveillance apparatus according to claim 1, wherein
   the control section estimates a current vehicle position based on the captured image data stored in the storage section and new captured image data output from the capturing section, when the past image is displayed, and superimposes an image indicating the estimated vehicle position on the past image so as to display a result of superimposition, and
   the control section determines the recovery condition to be established when estimation accuracy for the vehicle position is equal to or less than a predetermined value, and performs switching to the present image.

5. The periphery surveillance apparatus according to claim 1, wherein
   the control section causes the present image to be displayed in a first display mode and causes the past image to be displayed in a second display mode different from the first display mode.

6. The periphery surveillance apparatus according to claim 1, wherein
   the display section displays the present image or the past image together with a present side image based on side captured image data outputted from a side capturing section that captures images of right or left side region of the vehicle in a vehicle width direction, regardless of controlling for switching between the present image and the past image.

7. The periphery surveillance apparatus according to claim 1, wherein
   the control section causes images which have substantially the same viewpoint and field angle to be displayed as the present image and the past image.

8. A periphery surveillance apparatus comprising:
   a storage section that stores captured image data output from a capturing section for capturing an image of a region including a road surface and a region upward from the road surface, in a traveling direction of a vehicle;
   a display section that selectively displays at least one of a past image and a present image among pieces of captured image data which are stored in the storage section, the past image based on captured image data corresponding to a current underfloor area of the vehicle, and the present image based on new captured image data which is captured and output by the capturing section; and
   a control section that causes displaying to be performed in a first display mode when the present image is displayed, and causes an image having substantially the same viewpoint and field angle as the present image to be displayed in a second display mode different from the first display mode when the past image is displayed.

9. The periphery surveillance apparatus according to claim 1, wherein the permission condition is established when both conditions are satisfied, and the both conditions are a condition defined by a vehicle state and a condition defined by a switching request operation performed by a user.

10. The periphery surveillance apparatus according to claim 9, wherein it is determined whether or not an operation input section corresponding to image switching is caused to be active, on the basis of whether or not the condition defined by the vehicle state is established.

11. The periphery surveillance apparatus according to claim 8, wherein the permission condition is established when both conditions are satisfied, and the both conditions are a condition defined by a vehicle state and a condition defined by a switching request operation performed by a user.

12. The periphery surveillance apparatus according to claim 11, wherein it is determined whether or not an operation input section corresponding to image switching is caused to be active, on the basis of whether or not the condition defined by the vehicle state is established.

* * * * *